(12) United States Patent
Kerl et al.

(10) Patent No.: US 12,115,721 B2
(45) Date of Patent: Oct. 15, 2024

(54) DEVICE AND METHOD FOR GENERATIVELY PRODUCING A THREE-DIMENSIONAL OBJECT

(71) Applicant: EOS GmbH Electro Optical Systems, Krailling (DE)

(72) Inventors: Franz-Josef Kerl, Kumhausen (DE); Sebastian Mehl, Puchheim (DE); Alexander Schilling, Wildpoldsried (DE)

(73) Assignee: EOS GmbH Electro Optical Systems, Krailling (DE)

( * ) Notice: Subject to any disclaimer, the term of this patent is extended or adjusted under 35 U.S.C. 154(b) by 896 days.

(21) Appl. No.: 17/252,478

(22) PCT Filed: Jun. 21, 2019

(86) PCT No.: PCT/EP2019/066440
§ 371 (c)(1),
(2) Date: Dec. 15, 2020

(87) PCT Pub. No.: WO2019/243559
PCT Pub. Date: Dec. 26, 2019

(65) Prior Publication Data
US 2021/0252601 A1    Aug. 19, 2021

(30) Foreign Application Priority Data

Jun. 22, 2018 (DE) .......................... 102018210260.0

(51) Int. Cl.
*B33Y 10/00* (2015.01)
*B22F 10/28* (2021.01)
(Continued)

(52) U.S. Cl.
CPC ............ *B29C 64/153* (2017.08); *B22F 10/28* (2021.01); *B22F 10/32* (2021.01); *B22F 10/322* (2021.01);
(Continued)

(58) Field of Classification Search
CPC ... B29C 64/153; B29C 64/364; B29C 64/393; B22F 10/28; B22F 10/32; B22F 10/322;
(Continued)

(56) References Cited

U.S. PATENT DOCUMENTS

| 6,583,379 B1 | 6/2003 | Meiners et al. |
| 2016/0121398 A1 | 5/2016 | Schlick et al. |

(Continued)

FOREIGN PATENT DOCUMENTS

| DE | 19853947 | 2/2000 |
| DE | 102004031881 | 11/2007 |

(Continued)

OTHER PUBLICATIONS

German Search Report for Application No. 102018210260.0 dated Feb. 19, 2019, 9 pages.
(Continued)

*Primary Examiner* — Anthony M Liang
*Assistant Examiner* — Danny N Kang
(74) *Attorney, Agent, or Firm* — Polsinelli PC

(57) ABSTRACT

A flow device serves for a 3D printer. The device includes a gas conveying device for generating a gas stream and a process chamber with a build area for building the object. The process chamber includes a first gas inlet for introducing a gas stream into the process chamber, and a first gas outlet and a second gas outlet for discharging the gas stream. The first gas outlet is arranged closer to the build area than the second gas outlet in a direction perpendicular to the build area, and the first gas outlet is provided substantially within (Continued)

a lower third of a distance of the build area from a process chamber ceiling a first height range of the process chamber with respect to its extension in a direction perpendicular to the build area and the second gas outlet is provided substantially within the upper four fifths of the distance of the build area from the process chamber ceiling.

16 Claims, 6 Drawing Sheets

(51) Int. Cl.
*B22F 10/32* (2021.01)
*B22F 10/322* (2021.01)
*B22F 12/41* (2021.01)
*B22F 12/44* (2021.01)
*B22F 12/49* (2021.01)
*B22F 12/70* (2021.01)
*B29C 64/153* (2017.01)
*B33Y 30/00* (2015.01)
*B33Y 40/00* (2020.01)
*B22F 12/00* (2021.01)

(52) U.S. Cl.
CPC .............. *B22F 12/41* (2021.01); *B22F 12/70* (2021.01); *B33Y 10/00* (2014.12); *B33Y 30/00* (2014.12); *B33Y 40/00* (2014.12); *B22F 12/224* (2021.01); *B22F 12/44* (2021.01); *B22F 12/49* (2021.01)

(58) Field of Classification Search
CPC ........ B22F 12/41; B22F 12/70; B22F 12/224; B22F 12/44; B22F 12/49; B33Y 10/00; B33Y 30/00; B33Y 40/00; B33Y 50/02; Y02P 10/25
See application file for complete search history.

(56) References Cited

U.S. PATENT DOCUMENTS

| | | | |
|---|---|---|---|
| 2018/0126460 A1* | 5/2018 | Murphree | B33Y 40/00 |
| 2018/0133967 A1 | 5/2018 | Bechmann et al. | |
| 2018/0236550 A1 | 8/2018 | Herzog | |

FOREIGN PATENT DOCUMENTS

| | | |
|---|---|---|
| DE | 102010052206 | 5/2012 |
| DE | 102014000022 | 7/2015 |
| DE | 102016121770 | 5/2018 |
| EP | 2774703 | 9/2014 |
| EP | 2774703 A1 * | 9/2014 ............ B22F 3/1055 |
| EP | 3015197 | 5/2016 |
| JP | 2018003148 | 1/2018 |
| WO | 2015189619 | 12/2015 |
| WO | 2017102384 | 6/2017 |

OTHER PUBLICATIONS

PCT Search Report for Application No. PCT/EP2019/066440 dated Oct. 8, 2019, 13 pages.

* cited by examiner

DEVICE AND METHOD FOR GENERATIVELY PRODUCING A THREE-DIMENSIONAL OBJECT

TECHNICAL FIELD OF THE INVENTION

The present invention relates to a device and a method for generatively producing a three-dimensional object by layer-wise applying and selectively solidifying of a building material, the present invention in particular relates to a flow device and a flow method by means of which at least one gas stream is supplied to a process chamber of the device, which stream flows through the process chamber and is then discharged from the same.

BACKGROUND OF THE INVENTION

Devices and methods of this type are used, for example, in rapid prototyping, rapid tooling or additive manufacturing. An example of such a method is known as "selective laser sintering or laser melting". In this method, a thin layer of a building material in powder form is repeatedly applied and the building material is selectively solidified in each layer by selective irradiation of positions corresponding to a cross-section of the object to be produced with a laser beam.

Due to the energy input during the selective solidification, impurities such as splashes, smokes, fumes, vapors and/or gases can be generated that spread into the process chamber. In addition, when using a building material in powder form, impurities can occur by powder or powder dust being whirled up in the process chamber. Impurities can negatively affect the production process, for example by absorbing, scattering or deflecting the scanning laser beam, by depositing on a laser beam coupling window or by depositing on a layer of the building material. In order to meet high quality and efficiency requirements for the production process, such impurities must therefore be removed from the process chamber as quickly as possible.

For this purpose, DE 10 2014 000 022 A1 describes to supply a gas stream into the process chamber from a side by means of a gas injection via a diffuser. The gas stream is suctioned off on the side of the process chamber opposite to the supply substantially over the entire height of the chamber. In doing so, the suctioning is funnel-shaped.

Furthermore, DE 198 53 947 C1 discloses a process chamber whose side walls have first inlet and outlet openings for a first gas. In an elevated region of the side walls close to the ceiling, second inlet openings are provided for a second gas with a lower density. During operation a buffer volume of the second lighter gas is generated in the elevated region of the process chamber and a protective gas flow is generated above the processing area.

Furthermore, DE 10 2010 052 206 A1 describes a device for the production of a three-dimensional object having a process chamber that comprises a protective gas injection with which a protective gas flow is injected laterally into the process chamber. A deflecting device is arranged in the process chamber, which deflecting device deflects the laterally injected protective gas flow in such a way that the protective gas flow is first directed downwards and then back against the injection towards a protective gas extraction.

SUMMARY OF THE INVENTION

It is an object of the present invention to provide an alternative or improved device or an alternative or improved method for generatively producing a three-dimensional object by layer-wise applying and selectively solidifying a building material, by means of which device and method in particular the effectiveness and/or the completeness of the removal of impurities from the process chamber that are produced, among other things, during the selective solidification of the building material, can be increased.

This object is solved by a flow device according to claim 1, a production device according to claim 13, a flow method according to claim 14 and a production method according to claim 15. Further developments of the invention are given in the dependent claims each. In doing so, the methods can also be further developed by the features of the devices, which features are given below and in the dependent claims, or vice versa, and the features of the devices can also be used for further development among one another, as can the features of the methods.

According to the invention, a flow device for a device for producing a three-dimensional object by a layer-wise selective solidification of a building material at the locations corresponding to the cross-section of the object to be produced in the respective layer by irradiation by means of an energetic radiation comprises a gas conveying device for generating a gas stream and a process chamber with a build area for building the object. The process chamber at least comprises a first gas inlet for introducing a gas stream into the process chamber, and a first gas outlet and a second gas outlet spaced from the first gas outlet for discharging a gas stream from the process chamber. The first gas outlet is arranged closer to the build area than the second gas outlet in a direction perpendicular to the build area. Furthermore, the first gas outlet is provided substantially within a first height range of the process chamber with respect to the first outlet's extension in a direction perpendicular to the build area and the second gas outlet is provided substantially within a second height range of the process chamber with respect to the second outlet's extension in a direction perpendicular to the build area, wherein the first height range of the process chamber corresponds to a lower third of a distance of the build area from a process chamber ceiling and the second height range of the process chamber corresponds to the upper four fifths of the distance of the build area from the process chamber ceiling. Preferably, the first gas outlet is provided within the first height range with respect to its extension in a direction perpendicular to the build area and the second gas outlet is provided within the second height range of the process chamber with respect to its extension in a direction perpendicular to the build area.

The "spaced apart" gas outlets are to be understood as gas outlets separated from one another that are suitable for discharging gas from the process chamber independently from one another. For this purpose, for example, separate gas discharge channels or lines can be provided for the gas outlets. A gas conveying device can comprise a line for transporting the gas and a drive means for moving a volume of gas, such as a blower. For example, if the process chamber to be provided with a gas flow is part of a chain of gas-transporting channels or chambers, e.g. a closed process gas circulation system, a single drive means can be sufficient to move the gas in a preferential direction within the entire system. A gas stream is understood to be a volume of gas that is specifically moved in a preferential direction.

"Substantially within a height range" implies that the gas inlet or gas outlet is configured and arranged in the process chamber in such a way that it protrudes out of the respective height range only within a tolerance range of 5% of a process chamber height corresponding to the height range.

In general, in the context of the present application, a maximum clear height of the process chamber or a distance of the build area from the process chamber ceiling is to be understood as a distance of the build area from a highest point of the interior or the cavity of the process chamber.

Preferably, the maximum clear height of the process chamber, i.e., the maximum distance of the build area from the process chamber ceiling, exceeds a maximum ascending height to which splashes can get at the highest during the building process. Further preferably, the distance of the build area from the process chamber ceiling is many times larger than the maximum ascending height of the splashes, in particular at least twice, preferably at least three times, particularly preferably at least four times the maximum ascending height of the splashes. Even further preferably, a distance of the build area from the process chamber ceiling that corresponds to the first height range of the process chamber is at least as large as the maximum ascending height of the splashes, particularly preferably at least twice as large as the maximum ascending height of the splashes. In the context of the present application, splashes are to be understood as ejections of the building material that are generated during the selective solidification of the building material, i.e. by irradiating the building material with energetic radiation, and that get into the process chamber. The maximum ascending height of the splashes depends, among other things, on the building material used as well as on energy input parameters of the energetic radiation such as the power of the energetic radiation, the size of an impact area of the energetic radiation, the movement velocity of an impact area of the energetic radiation in the working plane, etc. For example, the maximum ascending height of the splashes can be 5 cm, 10 cm, or 15 cm.

The term "maximum ascending height of splashes" can refer to all splashes that can be detected during the production of a layer of an object, during an entire building process or a number of building processes. For example, the maximum ascending height can mean an apex of a trajectory of each splash. With this, it can be referenced to the apex farthest away in a direction perpendicular to the build area during an entire building process or during the production of a layer, or to a statistical mean or a median of the apexes. Preferably, the term "maximum ascending height" refers to the maximum ascending height of 90%, particularly preferably 99%, of those splashes with the lowest ascending height at the apex of their trajectory. This definition excludes statistical upward outliers, i.e. individual splashes with a particularly high ascending height at the apex of their trajectory.

The fact that the maximum clear height of the process chamber or the first height range of the process chamber is larger, in particular several times larger, than the maximum ascending height of the splashes provides for a large process chamber volume into which gaseous impurities (e.g. smoke, fumes, vapors and/or gases) can spread. Thus, for example, a better dilution of the gaseous impurities resulting from the selective solidification can be achieved, i.e. the impurities are present in lower volume concentrations in the process chamber. This can reduce the influence of such impurities on the production process, since the transmittance of the energetic radiation through the process chamber is reduced at high impurity concentrations. In addition, particularly good effects can be achieved in a process chamber with a large process chamber volume by using an inventive flow device described herein, since the flow device is in particular configured to cause a good removal of atmospheric impurities over a large height range.

In the context of the application, the process chamber is understood to be a hollow space that is partially bounded by the build area. Preferably, the build area forms part of a bottom region on a lower side of the process chamber during operation of the flow device. The process chamber can be a substantially closed cavity with the exception of at least one gas inlet and the gas outlets.

In the context of the application, the gas inlet is understood in particular to be a gas-permeable opening within the process chamber or in a wall of the process chamber, through which opening a gas stream flows into the process chamber in a preferential direction during operation of the flow device. In the context of the application, the gas outlet is understood in particular to be a gas-permeable opening within the process chamber or in a wall of the process chamber, through which opening a gas stream flows out of the process chamber in a preferential direction during operation of the flow device. The gas inlet and the gas outlet thus form an interface between a cavity of the process chamber and a cavity as part of the gas conveying device. For an assessment of the position of a gas inlet or a gas outlet or a distance between the gas inlets or gas outlets, their gas-permeable openings are therefore to be used. By providing two separate gas outlets it is possible, for example, to generate a gas stream in the process chamber that proceeds from the gas inlet, which gas stream branches out or splits towards the gas outlets and is then directed out of the process chamber through the gas outlets. In this way, gas can flow through a larger process chamber volume, in particular in the region of the process chamber near the outlets, than when using only one gas outlet, which can lead to a more efficient removal of impurities from certain regions of the process chamber, in particular those near the outlets. In particular, when using the flow device according to the invention in a device for producing a three-dimensional object, in which device an energetic radiation needed for the selective solidification of a building material passes through the process chamber before it enters the building material, a reduction of impurities in the process chamber atmosphere can reduce scattering or absorption of the energetic radiation. Thus, a larger portion or a predetermined minimum intensity of the energetic radiation can impinge on the building material and thus positively influence the selective solidification of the building material and finally the quality of the object produced.

Preferably, the first gas outlet and/or the second gas outlet is/are configured to and/or arranged on the process chamber and/or the gas conveying device is controlled in such a way that in operation a first pressure reference value that is assigned to a region on a side of the first and second gas outlets facing the process chamber exceeds a second pressure reference value that is assigned to a region on a side of the second gas outlet facing away from the process chamber and/or the first pressure reference value exceeds or is substantially equal to, in particular exactly equal to, a fifth pressure reference value that is assigned to a region on a side of the first gas outlet facing away from the process chamber. Alternatively or in addition, the first gas inlet preferably is configured to and/or arranged on the process chamber and/or the gas conveying device is controlled in such a way that in operation a first pressure reference value that is assigned to a region on a side of the first gas inlet facing the process chamber is smaller than a fourth pressure reference value that is assigned to a region on a side of the first gas inlet facing away from the process chamber.

Further preferably, the second gas outlet comprises at least one gas outlet field having a plurality of gas outlet openings spaced apart from one another for discharging a gas stream from the process chamber and the flow device comprises at least one outlet chamber downstream of the gas outlet field, the outlet chamber being at least partially bounded by the at least one gas outlet field, wherein the first pressure reference value comprises a first average pressure value representing a pressure in the process chamber and wherein the second pressure reference value comprises a second average pressure value representing a pressure in the outlet chamber, wherein during operation the first average pressure value is greater than the second average pressure value, preferably is greater in the range between 10 Pa and 120 Pa than the second average pressure value, in particular greater by at least 10 Pa, preferably by at least 20 Pa, more preferably by at least 30 Pa and/or greater by 120 Pa at most, preferably by 90 Pa at most, more preferably by 60 Pa at most. Alternatively or in addition, the first gas inlet preferably comprises at least one gas inlet field having a plurality of gas inlet openings spaced apart from one another for introducing a gas stream into the process chamber, and the first pressure reference value comprises a first average pressure value representing a pressure in the process chamber and the fourth pressure reference value comprises a fourth average pressure value, wherein during operation the fourth average pressure value is greater than the first average pressure value, preferably by at least 10 Pa, more preferably by at least 50 Pa, particularly preferably by at least 100 Pa. Alternatively or in addition, the fifth pressure reference value comprises a fifth average pressure value and the first pressure reference value comprises a first average pressure value, wherein preferably the fifth average pressure value is smaller than or equal to the first average pressure value, wherein more preferably the fifth average pressure value is smaller than the first average pressure value by 20 Pa at most, more preferably by 10 Pa at most, further preferably by 5 Pa at most, particularly preferably is substantially equal, in particular exactly equal, to the first average pressure value.

A pressure reference value can include a determined, e.g. calculated, simulated, measured or otherwise provided pressure or pressure value of the gas atmosphere in the respective region. Alternatively, a pressure reference value can also include a quantity physically representing the pressure. An average pressure value can, for example, comprise or be an arithmetic mean of a number of determined, preferably measured, pressure values. When referring to a side of a gas inlet field or gas outlet field facing the process chamber or facing away from the process chamber, it is assumed that the gas inlet field or gas outlet field—schematically understood—is substantially designed as a planar body with a relatively small depth extension that comprises surfaces with a large surface area on two opposite sides each, e.g. surfaces arranged parallel to each other and/or substantially flat. These two surfaces are understood to be the side facing the process chamber or facing away from the process chamber during operation. They can be separated by small faces having highly elongate surfaces with relatively small surface areas.

Here and below, two "substantially equal" pressures also include deviations within the scope of a measuring tolerance and/or within the scope of process-related pressure fluctuations and deviations.

By means of the defined pressure values in the individual regions and the pressure differences between the process chamber and upstream or downstream regions outside the process chamber, for example, an improved homogenization of at least one gas stream flowing through the process chamber can be achieved with respect to its flow properties. For example, a more homogeneous or more uniform distribution of flow directions, flow velocities, volume flows and/or pressures can be achieved.

The first gas outlet can also comprise a gas outlet field or alternatively have no gas outlet field. Preferably, the first gas outlet or an optionally provided gas outlet field is configured in such a way that there is substantially no pressure difference between a region directly upstream (i.e. in the process chamber) and a region directly downstream of the first gas outlet (i.e. in a gas pipe leading out of the process chamber). In this way, it is possible, for example, to achieve that a gas stream generated in a lower region of the process chamber close to the build area is not or only slightly slowed down towards the gas outlet side, thus enabling good removal of impurities close to the build area.

Preferably, an intermediate region of the process chamber, in particular of a process chamber wall, is provided between the second gas outlet, in particular a gas outlet field of the second gas outlet, and the first gas outlet, wherein the intermediate region does not have any gas outlet opening. Preferably, the intermediate region extends at least in a vertical spatial direction. The intermediate region can correspond to a gas-tight sealed region of the process chamber housing, which extends over a certain distance in a direction perpendicular to the build area (e.g. 10, 20 or 30 cm) between the first and the second gas outlet and over a certain distance in a direction parallel to the build area. For example, the first gas inlet and the first gas outlet can extend over approximately 15% of a maximum clear height of the process chamber, the intermediate region can extend over approximately 15% of the maximum clear height of the process chamber, and the second gas inlet and the second gas outlet can extend over approximately 60% of the maximum clear height of the process chamber. By providing an intermediate region in the process chamber or the process chamber wall, it is possible, for example, to generate two gas streams in the process chamber spatially separated from one another. In particular, these gas streams can have different flow properties (e.g. flow velocity), wherein the intermediate region can represent a zone where substantially no gas stream is generated or at least a zone in which there is no defined flow direction and/or low velocities occur. By substantially allowing for a spatial separation of the two gas streams, the intermediate region provides for a boundary layer with a large tolerance range and thus contributes to a reduction of a mutual interference of the gas streams.

When using the flow device according to this further development in a device for producing a three-dimensional object, the intermediate region can comprise a drive of a recoater provided in the device for the application of a layer of the pulverulent building material. The drive can, for example, comprise a movable axle guided by a rail on which axle the recoater is arranged and travels across the build area during operation. For example, the process chamber wall can comprise an axle passage on one or two opposite sides in the intermediate region, the axle passage being sealed gas-tight by means of a sliding shutter. An advantage of the recoater drive being arranged within the intermediate region is that an influence of at least the upper gas stream, and with suitable control also of the lower gas stream, by the recoater drive can be reduced and/or avoided at least during the selective solidification of the building material.

Preferably, the second gas outlet comprises at least one gas outlet field having a plurality of gas outlet openings spaced apart from one another for discharging a gas stream from the process chamber. Alternatively or in addition, the first gas inlet preferably comprises at least one gas inlet field having a plurality of gas inlet openings spaced apart from one another for introducing a gas stream into the process chamber. Alternatively or in addition, the first gas outlet preferably comprises at least one gas outlet field having a plurality of gas outlet openings spaced apart from one another for discharging a gas stream from the process chamber and/or the first gas inlet comprises at least one gas inlet field having a plurality of gas inlet openings spaced apart from one another for introducing a gas stream into the process chamber.

A gas inlet field or gas outlet field, i.e. a closed, at least two-dimensional region comprising gas inlets formed as gas inlet openings or gas outlets formed as gas outlet openings, is defined as a gas-impermeable face across which several gas-permeable openings (i.e. the gas inlet openings or gas outlet openings) are distributed. The openings are spaced from one another, i.e. separated by an impermeable area. For example, they can be designed as apertures in the gas-impermeable area. If the openings are understood as three-dimensional channels with two openings, a first channel opening can always face the process chamber and a second channel opening can always face away from the process chamber during operation. Due to the plurality, in particular a large number of openings, a total area over which the gas inlet openings or gas outlet openings are distributed is regarded as a criterion for a size of the gas inlet field or gas outlet field and not a single opening provided therein. A background for this is the observation that a gas stream flowing in an unguided manner upstream and downstream of a gas inlet or gas outlet opening typically alters its cross-section so that an opening or an opening cross-section determines a cross-section of the gas stream only to a limited extent or locally. In other words, a gas stream flowing through the openings of a gas inlet field in partial gas streams can be regarded as a substantially homogeneous total flow again from a certain distance on after emerging from the gas inlet openings due to spreading of the individual partial gas streams. In this way, a cross-section of a gas stream passing through a gas inlet field or a gas outlet field can be determined by the field's total extension or total area. The areal extent or the surface area of the gas inlet field or gas outlet field (as opposed to a depth or thickness, which can be negligibly small) can be determined, for example, by understanding the respective outermost gas inlet openings or gas outlet openings or their edges as the boundary or frame of the gas inlet field or the gas outlet field. Preferably, the openings are distributed regularly, for example in a grid or raster pattern of rows and columns or alternatively along concentric circles, along a spiral or according to other geometric patterns. This results in a uniform or homogeneous spacing of the openings from one another within a certain spectrum and a uniform or homogeneous ratio of gas impermeable and gas-permeable area proportions across the area of the gas inlet field or gas outlet field.

The gas inlet field or gas outlet field makes it possible, for example, to supply the gas into the process chamber or discharge it from the process chamber over a large area. In comparison to an arrangement in which the gas is discharged from the process chamber over a large area without a gas outlet field and via a funnel-shaped outlet chamber downstream of the gas outlet, the arrangement of the gas outlet field at the second gas outlet can have, among other things, the following advantages or effects:

- No main flow direction is generated in the process chamber that is largely influenced by the position and/or geometry and/or extent of the funnel or is oriented towards the funnel outlet.
- In a region of the process chamber upstream of the gas outlet field, a direction of a gas stream flowing to the gas outlet field is more uniform and/or a flow velocity of the gas stream is more uniform.
- Peripheral and transitional regions of the process chamber are flowed through in a better defined, more uniform direction. In particular, the formation of local eddies and/or rolls, which can prevent an effective removal of impurities, can be at least reduced, preferably avoided.

Preferably, the flow device comprises at least one outlet chamber downstream of the gas outlet field of the second gas outlet (i.e. on a side of the gas outlet field facing away from the process chamber), the outlet chamber being at least partially bounded by the at least one gas outlet field. The outlet chamber can receive a volume of gas that has been discharged over a large area out of the process chamber.

Preferably, the flow device further comprises an outlet channel for discharging the gas stream from the outlet chamber, wherein an average opening cross-section of the outlet channel is smaller than the area of the gas outlet field and preferably comprises at most 50%, more preferably at most 30%, particularly preferably at most 10% of the area of the gas outlet field. This provides, for example, for a channel for discharging the gas. Likewise, a supply channel described below can be provided for a gas inlet or for a gas inlet chamber bounded by a gas inlet field. The inlet and outlet channels can be configured as a rigid pipe or a tubing, for example, and can optionally be connected to one another by a pipe that can be part of a process gas recirculation device. The configuration of the latter can be based on the principle of a closed process gas circuit, for example, and include a filter downstream of the process chamber for cleaning or reprocessing the process gas before it is fed back into the process chamber. The supply channel can differ from the inlet chamber and the outlet channel can differ from the outlet chamber by the respective opening cross-section. For example, a largest opening cross-section of the supply channel or of the outlet channel can be smaller than a smallest opening cross-section of the inlet chamber or the outlet chamber. Alternatively or additionally, for example, the supply channel and the outlet channel can have a substantially constant opening cross-section, whereas the inlet chamber and/or the outlet chamber has a variable opening cross-section. Preferably, the inlet chamber is configured to be gas-tight sealed with the exception of at least one connected supply channel and at least one gas inlet field. Preferably, the outlet chamber is configured gas-tight sealed with the exception of at least one connected outlet channel and at least one gas outlet field.

Preferably, a maximum horizontal extension of the gas outlet field of the second gas outlet comprises at least 60%, preferably at least 90%, further preferably at least 120% of a side length or a diameter of the build area, in particular of a side length of a rectangular build area or a diameter of a circular build area. Thus it can be achieved, for example, that a gas flows across or through a large horizontal region of the build area or of the process chamber, in particular the entire width of the build area, and thus a removal of impurities can take place above substantially the entire area of the build area. Particularly preferred, a horizontal extension of the gas outlet field substantially corresponds to a maximum extension of the interior of the process chamber in a corresponding plane parallel to the build area. Thus, a flow through the entire interior of the process chamber can be ensured at least in a horizontal direction and a particularly high cleaning effect can be achieved.

Preferably, the process chamber further comprises a second gas inlet spaced from the first gas inlet, wherein the first gas inlet is arranged closer to the build area than the second gas inlet in a direction perpendicular to the build area, and wherein further preferably the first gas inlet is provided substantially within the first height range of the process chamber and the second gas inlet is provided substantially within the second height range of the process chamber. Basically, the first and the second gas inlet can be arranged offset to one another in such a way that they both at least partially occupy a height range together, wherein an additional horizontal spacing prevents them from overlapping. Preferably, the first gas inlet is arranged in a height range of the process chamber adjacent to the build are and the second gas inlet is arranged in a height range distant from the build area. Preferably, the first gas inlet and/or the first gas outlet are configured and/or arranged on the process chamber in such a way that they extend in a direction perpendicular to the build area within a lowest third, further preferably within a lowest fifth, still further preferably within a lowest sixth of a maximum clear height of the process chamber (e.g. of a maximum distance of the process chamber ceiling from the build area). Alternatively or additionally, preferably the second gas inlet and/or the second gas outlet are configured and/or arranged on the process chamber in such a way that they extend in a direction perpendicular to the build area at least within an upper third, preferably at least within the upper half, more preferably at least within the upper two thirds, further preferably within the upper four fifths of a maximum clear height (e.g. of a maximum distance of the process chamber ceiling from the build area) of the process chamber. According to a preferred embodiment of the invention, the gas inlets and gas outlets are configured such that the first gas inlet and/or the first gas outlet has/have a smaller extension in a direction perpendicular to the build area than the second gas inlet and/or the second gas outlet.

The advantage of this configuration is that gas can flow in a specific manner through as much of the vertical dimension of the process chamber as possible. The gas inlets and/or gas outlets can be provided in a process chamber wall of the process chamber that bounds the interior of the process chamber. They can also be set off from the process chamber wall and, for example, project into the process chamber or be set back. Preferably, the gas inlet(s) as well as the gas outlets are fixed in place relative to the process chamber.

By providing two gas inlets and two gas outlets each, it is possible, for example, to generate substantially two gas streams in the process chamber, which gas streams flow from the first and second gas inlet to the first and second gas outlet, respectively, and are spatially separated from each other. In doing so, the gas streams can be configured such that they have different flow properties, in particular different flow velocities. Because the (lower) first gas inlet and gas outlet are arranged in a height range of the process chamber adjacent to the build area and the (upper) second gas inlet and gas outlet are arranged in a height range distant from the build area it is possible, for example, to generate a (lower) gas stream close to the build area and an (upper) gas stream distant from the build area. If the first and second gas inlets and gas outlets have different extensions in height it is further possible to substantially provide two flow regions differing in size at least vertically. In particular, a lower gas stream (flowing from the first gas inlet to the first gas outlet) can substantially transport occurring impurities away from the location of the impact point or impact area of the energy beam(s) or just above it (e.g. a few millimeters or centimeters above the build area) so that these impurities do not spread into the process chamber or only to a smaller extent. An upper gas stream (flowing from the second gas inlet to the second gas outlet) can substantially remove impurities that spread to regions of the process chamber further away from the plane of the build area, for example because they were not sufficiently captured by the lower gas stream or because the lower gas stream was only partially removed directly from the process chamber. Optionally, partial gas streams can also flow from the second gas inlet to the first gas outlet and/or from the first gas inlet to the second gas outlet.

Preferably, the second gas inlet is configured to and/or arranged on the process chamber and/or the gas conveying device is controlled in such a way that in operation a first pressure reference value that is assigned to a region on a side of the second gas inlet facing the process chamber is smaller than a third pressure reference value that is assigned to a region on a side of the second gas inlet facing away from the process chamber.

Further preferably, the second gas inlet comprises at least one gas inlet field having a plurality of gas inlet openings spaced apart from one another for introducing a gas stream into the process chamber and the flow device comprises at least one inlet chamber upstream of the gas inlet field, the inlet chamber being at least partially bounded by the at least one gas inlet field, wherein the first pressure reference value comprises a first average pressure value representing a pressure in the process chamber and the third pressure reference value comprises a third average pressure value representing a pressure in the inlet chamber, wherein during operation the third average pressure value is greater than the first average pressure value, preferably is greater in the range between 10 Pa and 120 Pa than the first average pressure value, in particular greater by at least 10 Pa, preferably by at least 20 Pa, more preferably by at least 30 Pa and/or greater by 120 Pa at most, preferably by 90 Pa at most, more preferably by 60 Pa at most.

For example, the defined pressure values in the individual regions and the pressure differences between the process chamber and upstream regions outside the process chamber can achieve an improved homogenization of at least one gas stream flowing through the process chamber with respect to its flow properties. For example, a more uniform or homogeneous distribution of flow directions, flow velocities, volume flows and/or pressures can be achieved.

Preferably, the first gas inlet and/or the second gas inlet are provided on a first side of the process chamber and the first and/or the second gas outlet are provided on a second side of the process chamber opposite the first side, in particular the gas inlet field of the second gas inlet (see below) and the gas outlet field of the second gas outlet and/or the gas inlet field of the first gas inlet and the first gas outlet are preferably arranged within the process chamber on side faces of the process chamber wall opposite to each other, preferably substantially parallel to each other. The process chamber can have any geometry, preferably it is substantially cuboid or has a substantially rectangular horizontal section. An opposed arrangement of the gas inlets and the gas outlets has the advantage that the gas stream(s) capture or flow through as large a region of the interior of the process chamber as possible. This promotes an effective dilution or displacement of impurities into/out of the process chamber. Due to a frequently central arrangement of the build area within the process chamber or the process chamber bottom, impurities can be reliably removed from the region above the build area or—in case of using the flow device further developed in this way in a device for producing a three-dimensional object—from the working area of the radiation energy used for the selective solidification of the building material. Alternatively or additionally, in a projection of the gas inlet field of the second gas inlet onto the gas outlet field of the second gas outlet in a direction parallel to the build area, the (projected) area of the gas inlet field mapped onto an area of the gas outlet field preferably has a surface area that is at most equal to the surface area of the surface of the gas outlet field, preferably smaller than the surface area of the surface of the gas outlet field. This makes it possible, for example, to generate a gas stream that is substantially parallel to the build area.

Preferably, the first gas inlet and/or the first gas outlet is/are configured and/or arranged on the process chamber and/or the gas conveying device is controlled such that in operation of the flow device substantially a first gas stream is generated in the process chamber by means of the first gas inlet and/or the first gas outlet, and the second gas inlet and/or the second gas outlet is/are configured and/or arranged on the process chamber and/or the gas conveying device is controlled such that in operation of the flow device substantially a second gas stream is generated in the process chamber by means of the second gas inlet and/or the second gas outlet. Further preferably, the first gas inlet and/or the first gas outlet is/are configured and/or arranged on the process chamber and/or the gas conveying device is controlled such that in operation of the flow device a first gas stream is generated in the process chamber by means of the first gas inlet and/or the first gas outlet, and the second gas inlet and/or the second gas outlet is/are configured and/or arranged on the process chamber and/or the gas conveying device is controlled such that in operation of the flow device a second gas stream is generated in the process chamber by means of the second gas inlet and/or the second gas outlet. Thus, the flow device is configured and/or controlled such that during operation at least a first gas stream is generated in the process chamber, which first gas stream is substantially directed from the first gas inlet to the first gas outlet, and at least a second gas stream is generated, which second gas stream is substantially directed from the second gas inlet to the second gas outlet. According to an alternative configuration, the flow device is configured and/or controlled such that in operation the at least one first gas stream from the first gas inlet is directed only to the first gas outlet and the at least one second gas stream from the second gas inlet is directed only to the second gas outlet. This makes it possible, for example, to generate two gas streams in the process chamber. A certain degree of separate guidance of the gas stream in a region upstream and/or downstream of the process chamber, i.e. e.g. in a supply line and/or a discharge line through which the gas stream flows into or out of the process chamber, is a prerequisite for the flow properties of each gas stream being individually adjustable to a certain degree. In the context of the invention, it is desirable to achieve a largest possible (vertical) extension and cross-sectional area of the flow for the upper, i.e. second, gas stream and thus to have the gas flow through as large a volume of the process chamber as possible, wherein a relatively low flow velocity is sufficient. For the lower, i.e. first, gas stream a defined, relatively high velocity is desirable, wherein a relatively small (vertical) extension and cross-sectional area of the flow is sufficient. A control or an adjustment of the flow properties of the two gas streams is preferably also possible during the production of a three-dimensional object. Therein, the term "substantially" means in the context of generating a gas stream or the first and the second gas streams that, firstly, further gas streams, in particular partial streams of the first and/or the second gas stream with deviating flow properties are not excluded. Secondly, process-related irregularities of the gas streams are also included, which are also referred to as "wabbling" of the gas streams. Such included deviations particularly affect the peripheral regions of a gas stream.

Preferably, in operation of the flow device, the first and the second gas streams are unguided gas streams and/or are directed substantially from a first side of the process chamber, in particular of the chamber wall, to a second side of the process chamber, in particular of the chamber wall, preferably opposite to the first side. Gas flowing through the process chamber from a first side to an opposite second side has the advantage that the gas streams pass through as large a volume portion of the interior of the process chamber as possible, thus ensuring efficient cleaning of the process chamber. Alternatively or additionally, the first and the second gas streams preferably flow through the process chamber substantially in the same direction and/or the first and the second gas streams flow substantially transverse, preferably perpendicular to a recoating direction in which a layer of the building material is applied in the build area. Substantially rectifying of the flow directions of the gas streams has the advantage that the streams interfere with each other to a smaller extent in regions where they are adjacent. This prevents undefined regions in which impurities can possibly be insufficiently displaced or undesiredly swirled. By adapting the flow directions of the gas streams to a direction substantially perpendicular to the recoating direction, an influence in particular of the lower (first) gas stream by the recoating process, i.e. the movement of the recoater in the recoating direction, can at least be reduced. On the other hand, an alignment of the flow direction in particular of the lower gas stream substantially parallel to the recoating direction can cause the recoater to disturb or obstruct the lower gas stream or can require a structural measure so that the recoater, in particular during the selective solidification of an applied layer, is e.g. pivoted or sunk so as not to obstruct or influence the lower gas stream.

Preferably, the flow device is configured and/or controlled so that the first gas stream has on average a different, preferably a higher flow velocity than the second gas stream during operation. A higher flow velocity of the first gas stream, being close to the build area, has the advantage that occurring impurities can be transported away quickly and as close as possible to their location of origin, i.e. the build area, and thus cannot spread into the process chamber in the first place. Alternatively or additionally, a ratio of an average flow velocity of the first gas stream and an average flow velocity of the second gas stream is at least 1.5:1, preferably at least 2:1, further preferably at least 3:1, particularly preferably at least 4:1. This makes it possible, for example, to provide gas streams with different flow properties in the process chamber. Here, the first gas stream and the second gas stream can have the same or similar or different volume flows. For example, a ratio of a volume flow of the first gas stream to a volume flow of the second gas stream can be 50:50, 60:40, 70:30, 45:55 or 35:65. When using the flow device according to the invention in a device for producing a three-dimensional object, the flow velocities and/or volume flows can preferably also be adjusted dynamically during the production of a three-dimensional object on the basis of defined specifications. For example, the volume flow ratio can be adjusted depending on temporal and/or local dynamic concentrations of atmospheric impurities in the process chamber that can be detected by a monitoring device if necessary. Alternatively or additionally, for example an interval switching can be chosen that allows a partial gas stream to flow at certain time intervals through the intermediate region or through other zones/volumes of the process chamber where substantially no defined gas flow is provided, so that standing, billowing or circulating impurities are removed or transported away.

Preferably, in operation of the flow device, at least a partial stream of the second gas stream flows at least temporally towards the first gas outlet. This makes it possible, for example, to have gas flowing through a height region of the process chamber corresponding to an intermediate region of the process chamber wall in order to e.g. enable removal of impurities in the intermediate region, too.

Preferably, the second gas inlet further comprises a slot-shaped, i.e. elongate, gas inlet opening that is located closer to a process chamber ceiling than the gas inlet opening of the second gas inlet or the gas inlet openings of the gas inlet field. Additionally or alternatively, the slot-shaped gas inlet opening is preferably arranged such that its longitudinal axis is substantially parallel to a plane in which a surface of at least one coupling window for coupling the energetic radiation into the process chamber, which surface faces the process chamber, is located. In this way, for example, a further gas stream (also called ceiling stream or ceiling gas stream) can be generated that flows along at least a portion of the process chamber ceiling. Due to the larger opening cross-section of the slot-shaped gas inlet opening as compared to the gas inlet openings of the gas inlet field, the ceiling gas stream can have an increased volume flow, for example. This provides, for example, for an efficient protection of the coupling window and, if necessary, of its surroundings from impurities such as smoke or dust.

Preferably, the second gas inlet comprises at least one gas inlet field having a plurality of gas inlet openings spaced apart from one another for introducing a gas stream into the process chamber. This can, for example, provide for the advantage that the gas can be introduced into the process chamber substantially homogeneously and over a large area via the area of the gas inlet field. Altogether, by providing a gas inlet field and a gas outlet field, for example, a good removal of impurities from the process chamber can be achieved which can have a positive effect on the quality of the object(s) produced.

Preferably, an orientation of a plane of an opening outlet area of the gas inlet field of the second gas inlet to the interior of the process chamber deviates from a perpendicular line to the plane of the build area at at least 60% of the gas inlets, preferably at least 80% of the gas inlets, particularly preferably for all gas inlets by 30° at most, preferably by 20° at most, particularly preferably by 10° at most. This makes it possible, for example, to generate a substantially horizontal gas flow in the process chamber.

Preferably, the flow device comprises at least one inlet chamber upstream of the gas inlet field of the second gas inlet (i.e. on a side of the gas inlet field facing away from the process chamber), the inlet chamber being at least partially bounded by the at least one gas inlet field. The inlet chamber can, for example, provide for a volume of gas that can be introduced into the process chamber over a large area via the gas inlet field.

Preferably, the flow device further comprises a supply channel for supplying the gas stream into the inlet chamber, wherein an average opening cross-section of the supply channel is smaller than the area of the gas inlet field, preferably comprises at most 50%, more preferably at most 30%, particularly preferably at most 10% of the area of the gas inlet field. This provides, for example, for a channel for supplying the gas.

Preferably, a maximum horizontal extension of the gas inlet field of the second gas inlet comprises at least 60%, preferably at least 90%, further preferably at least 120% of a side length or a diameter of the build area, in particular a side length of a rectangular build area or a diameter of a circular build area. Thus it can be achieved, for example, that gas flows over or through a large horizontal region of the build area or of the process chamber, in particular the entire width of the build area, and thus a removal of impurities above substantially the entire area of the build area can take place. Particularly preferred, a horizontal extension of the gas inlet field substantially corresponds to a maximum extension of the interior of the process chamber in a corresponding plane parallel to the build area. Thus, at least in the horizontal direction, gas flowing through the entire interior of the process chamber can be ensured and a particularly high cleaning effect can be achieved.

Preferably, an extension of the gas inlet field of the second gas inlet and/or the gas outlet field of the second gas outlet in a direction perpendicular to the build area comprises at least 30%, preferably at least 60%, particularly preferably at least 80% of a distance of the build area from a process chamber ceiling (i.e. of a maximum clear height of the process chamber or of a process chamber height). Alternatively or additionally, preferably an area of the gas outlet field of the second gas outlet comprises at least 30%, further preferably at least 60%, particularly preferably at least 90% of an area of the gas inlet field of the second gas inlet. This makes it possible, for example, to generate a gas stream in the process chamber that flows through a large region of the process chamber, in particular of the process chamber height, i.e. the vertical process chamber extension.

Preferably, the gas inlet field of the second gas inlet and/or the gas outlet field of the second gas outlet has at least one of the following properties:
  a sum of the surface areas of the gas inlet openings of the gas inlet field and/or of the gas outlet openings of the gas outlet field comprises at least 2%, preferably at least 5%, particularly preferably at least 10% of a total surface area of the gas outlet field or gas inlet field, respectively;
  the gas inlet openings and/or the gas outlet openings are arranged in the gas inlet field or the gas outlet field substantially regularly spaced from one another and/or in a grid-like manner;
  the gas inlet opening cross-sections and/or the gas outlet opening cross-sections are substantially equal in size;
  the surface areas of the gas inlet openings and/or of the gas outlet openings are substantially the same size amongst themselves;
  an area element of the gas inlet field and/or of the gas outlet field comprises a minimum area proportion of an opening of the first gas inlet or the first gas outlet, respectively;
  the gas inlet field and/or the gas outlet field comprise/comprises a plurality, preferably at least four, further preferably at least ten, further preferably at least 50, further preferably at least 100, further preferably at least 300 gas inlet openings or gas outlet openings, respectively;
  a distance of the gas inlet or outlet openings from each other is at least one and a half times, preferably at least twice and/or ten times at most, preferably five times at most their respective maximum opening diameter;

a sum of the gas inlet opening cross-sectional areas of the gas inlet field and a sum of the gas outlet opening cross-sectional areas of the gas outlet field differ from each other by at most 30%, preferably by at most 20%, particularly preferably by at most 10%;

an average surface area of the gas inlet and/or outlet openings of the gas inlet field or the gas outlet field, respectively, is in the range of 4 mm$^2$ to 500 mm$^2$, preferably at least 4 mm$^2$, further preferably at least 16 mm$^2$, particularly preferably at least 36 mm$^2$ and/or preferably 500 mm$^2$ at most, more preferably 100 mm$^2$ at most, particularly preferably 50 mm$^2$ at most;

the surface area of a side of the gas outlet field facing the process chamber during operation is in the range from 30% to 200% of the surface area of a side of the gas inlet field facing the process chamber during operation, preferably at least 30%, further preferably at least 60%, particularly preferably at least 90% and/or preferably 200% at most, further preferably 150% at most, particularly preferably 130% at most.

This provides, for example, for a gas inlet field or gas outlet field for introducing the gas stream into the process chamber or for discharging the gas stream from it.

The gas inlet field or gas outlet field can be an integral part of a process chamber wall, i.e. a transition from its gas-impermeable areal portion to the process chamber wall can be seamless. Alternatively, the gas inlet field or gas outlet field can be a separate element that is mounted or fixed e.g. at the interface between the process chamber and a gas supply/gas discharge connected to it. For example, the gas inlet field or gas outlet field can be designed as a perforated plate, a nozzle battery, a nozzle grid, a cassette nozzle, a sieve or a porous plate. Preferably, the gas inlet field and/or the gas outlet field is/are designed as a grid and/or a perforated plate, which is preferably configured to be removable from the process chamber wall and/or exchangeable. This makes it possible, for example, to influence and/or adjust properties of a gas flow, such as flow velocity and/or volume flow and/or flow direction, by selecting a suitable grid or perforated plate.

Preferably, the gas outlet field of the second gas outlet is located substantially, further preferably exactly, in a plane whose orientation or directionality satisfies at least one of the following conditions:

the orientation of the plane is adapted to a line perpendicular to the build area, preferably a deviation of the orientation of the plane from a perpendicular to the build area is 60° at most, preferably 45° at most, further preferably 30° at most, further preferably 10° at most; particularly preferably the plane extends substantially perpendicular to the build area, in particular exactly perpendicular to the build area;

the plane extends substantially, preferably exactly, perpendicular to an average direction of a number, preferably a majority, of partial gas inlet streams of the gas stream, which partial gas inlet streams flow through the gas inlet field of the second gas inlet when the gas stream enters the process chamber during operation;

the orientation of the plane is adapted to an orientation of a number, preferably a majority, of gas inlet channels of the gas inlet field of the second gas inlet; preferably, a deviation of the orientation of the number, preferably of the majority, in particular of all gas inlet channels of the gas inlet field of the second gas inlet from the orientation of the plane of the gas outlet field is at least 30°, preferably at least 45°, further preferably at least 60°, further preferably at least 80°, in particular exactly 90°; the orientation of a gas inlet channel is to be understood as an orientation of a shortest connecting line between a central point or geometric center of a first opening cross-sectional area of the respective gas inlet channel and a central point or geometric center of a second opening cross-sectional area of the same gas inlet channel;

the orientation of the plane is adapted to the direction of at least one marginal beam that can be directed onto the working plane or the build area by means of an irradiation device during operation of the production device, wherein preferably the orientation of the plane deviates from the direction of the marginal beam by 60° at most, preferably by 30° at most;

the orientation of the plane is adapted to the shortest connecting line between an irradiation device of the production device, in particular of a deflecting device (scanner) of an irradiation device, and a peripheral line of the build area, wherein preferably the orientation of the plane deviates from the direction of the connecting line by 60° at most, preferably by 30° at most.

The orientation or directionality of the plane is defined by a direction or a vector in the plane itself and not by a perpendicular line or a normal vector to the plane. The term "substantially perpendicular" takes into consideration angular deviations of up to 10° from the perpendicular.

This makes it possible, for example, to further optimize a gas stream flowing through the process chamber, in particular to that effect that the gas stream flows through the process chamber substantially parallel to the build area or horizontally and/or is adapted to a geometry of the process chamber and/or of a beam path of a marginal beam. Therein, a marginal beam is understood to be an outermost energy beam, i.e. a beam of an irradiation device in a device for the production of a three-dimensional object which beam is deflected furthest from a perpendicular to the build area and which impinges on the build area during the production of the object. Alternatively, the marginal beam can also be the energy beam that is deflected maximally possible from a perpendicular to the build area and can still be focused on the build area by an imaging optics of the irradiation device.

According to the invention, a device for producing a three-dimensional object by a layer-wise selective solidification of a building material at the locations corresponding to the cross-section of the object to be produced in the respective layer by irradiation by means of an energetic radiation comprises a gas conveying device for generating a gas stream, an irradiation device for generating at least one energy beam of the energetic radiation, a building container for receiving the building material and a process chamber with a build area for building the object, the building container being arranged below the process chamber. The process chamber comprises at least a first gas inlet for introducing a gas stream into the process chamber, and a first gas outlet and a second gas outlet spaced from the first gas outlet for discharging a gas stream from the process chamber, wherein the first gas outlet is arranged closer to the build area than the second gas outlet in a direction perpendicular to the build area. Further, the first gas outlet is provided substantially within a first height range of the process chamber with respect to the first outlet's extension in a direction perpendicular to the build area and the second gas outlet is provided substantially within a second height range of the process chamber with respect to the second outlet's extension in a direction perpendicular to the build area, wherein the first height range of the process chamber corresponds to a lower third of a distance of the build area from a process chamber ceiling and the second height range of the process chamber corresponds to the upper four fifths of the distance of the build area from the process chamber ceiling. Preferably, the first gas outlet is provided within the first height range of the process chamber with respect to its extension in a direction perpendicular to the build area and the second gas outlet is provided within the second height range. This provides, for example, for a production device with an improved flow device for generating a gas stream.

A flow method according to the invention serves for a process chamber in a device for producing a three-dimensional object by a layer-wise selective solidification of a building material at locations corresponding to the cross-section of the object to be produced in the respective layer by irradiation by means of an energetic radiation, wherein the device comprises a gas conveying device for generating a gas stream, an irradiation device for generating at least one energy beam of the energetic radiation, a building container for receiving the building material, and the process chamber comprises a build area for building the object, wherein the building container is arranged below the process chamber. The process chamber comprises at least a first gas inlet for introducing a gas stream into the process chamber, and a first gas outlet and a second gas outlet spaced from the first gas outlet for discharging a gas stream from the process chamber, wherein the first gas outlet is arranged closer to the build area than the second gas outlet in a direction perpendicular to the build area. Furthermore, the first gas outlet is provided substantially within a first height range of the process chamber with respect to the first outlet's extension in a direction perpendicular to the build area and the second gas outlet is provided substantially within a second height range of the process chamber with respect to the second outlet's extension in a direction perpendicular to the build area, wherein the first height range of the process chamber corresponds to a lower third of a distance of the build area from a process chamber ceiling and the second height range of the process chamber corresponds to the upper four fifths of the distance of the build area from the process chamber ceiling. Preferably, the first gas outlet is provided within the first height range of the process chamber with respect to its extension in a direction perpendicular to the build area and the second gas outlet is provided within the second height range. The flow method comprises at least the following steps: introducing a gas stream through the at least one first gas inlet into the process chamber and discharging a gas stream from the process chamber through the first gas outlet and the second gas outlet. With the flow method it is also possible to achieve the effects described above with regard to the flow device, for example.

In an inventive method for producing a three-dimensional object in a device described above at least one gas stream is generated in the process chamber by means of a flow method described above at least temporarily during the layer-wise production of the three-dimensional object, preferably at least during the irradiation of the building material by means of the energetic radiation. This makes it possible, for example, to produce a three-dimensional object using an improved flow method.

Preferably, at least during a duration of the irradiation of the building material with the energetic radiation, preferably at least during an entire production process of the object(s) to be produced in a building container, a first pressure reference value assigned to a region on a side of the first and second gas outlet facing the process chamber is substantially greater than a second pressure reference value assigned to a region on a side of the second gas outlet facing away from the process chamber. Alternatively or additionally, preferably a third pressure reference value assigned to a region on a side of the second gas inlet facing away from the process chamber is greater than the first pressure reference value. Alternatively or additionally, preferably a fourth pressure reference value assigned to a region on a side of the first gas inlet facing away from the process chamber is greater than the first pressure reference value.

According to the invention, a control unit for a device described above is configured and/or programmed to control the device in such a manner that it is suitable for carrying out an inventive flow method and/or an inventive production method.

BRIEF DESCRIPTION OF THE DRAWINGS

Further features and expediencies of the invention are set out in the description of exemplary embodiments with the aid of the attached drawings.

DETAILED DESCRIPTION OF THE EMBODIMENTS

Figure 1:
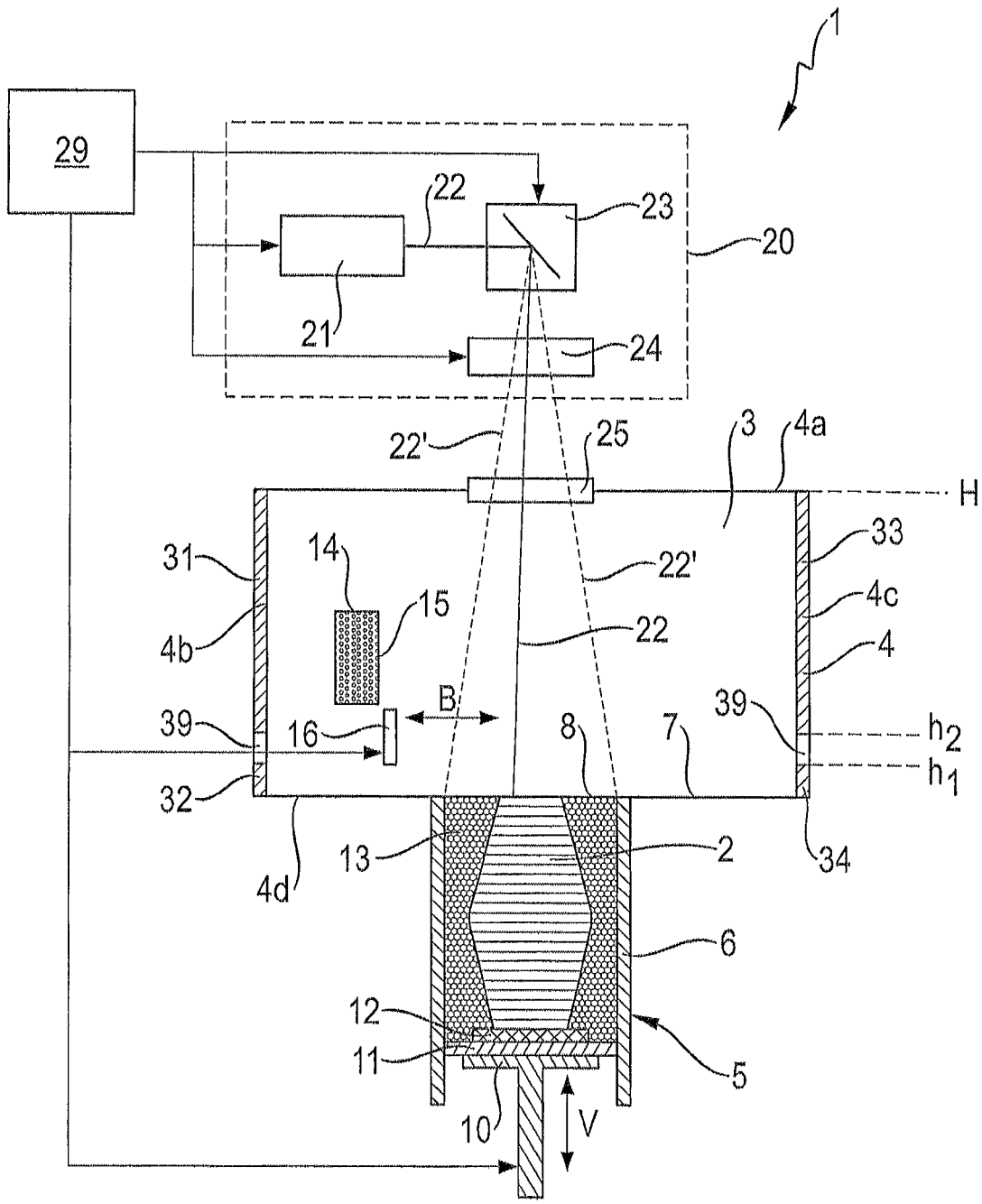
FIG. 1 shows a schematic view, partially depicted in cross-section, of an embodiment of a device for generatively producing a three-dimensional object according to the present invention.

In the following, an embodiment of the present invention is described with reference to FIG. 1. The device shown in FIG. 1 is a laser sintering or laser melting device 1. For building an object 2, the device comprises a process chamber 3 with a chamber wall 4.

A container 5 open to the top is arranged below the process chamber 3, the container having a container wall 6. Inside the container 5, which is also referred to as a building container, a support 10 is arranged that can be moved in a vertical direction V, to which support a base plate 11 is attached that seals the container 5 to its bottom and thus forms its bottom. The base plate 11 can be a plate formed separately from the support 10 and attached to the support 10, or it can be formed integrally with the support 10. Depending on the powder and process used, the base plate 11 can also have a building platform 12 attached as a building base on which the object 2 is built. The object 2 can also be built on the base plate 11 itself, which then serves as a building base.

A working plane 7 is defined by the upper opening of the container 5, wherein the region of the working plane 7 located within the opening, which region can be used to build the object 2, is referred to as a build area 8. The working plane 7 is also the surface of a working plate 4*d* facing the interior of the process chamber 3, i.e. the upper surface of the working plate. In this exemplary embodiment, the working plate 4*d* also forms the bottom of the process chamber 3 and surrounds the container 5 on all sides. The working plate 4*d* and thus the working plane 7 is spaced from a ceiling 4*a* of the process chamber wall 4 by a process chamber height H. The process chamber height H is also referred to as the maximum clear height of the process chamber, since a ceiling region of the process chamber can have a non-uniform height level, e.g. with roof slopes.

In FIG. 1, the object 2 to be formed in the container 5 on the building platform 12 is shown below the working plane 7 in an intermediate state with several selectively solidified layers surrounded by building material 13 that remained unsolidified.

In a first side 4*b* of the chamber wall 4 a first gas inlet 32 (in the following lower gas inlet) and a second gas inlet (in the following upper gas inlet) are provided. The upper gas inlet is designed as a gas inlet field 31 and the lower gas inlet 32 is preferably designed as a gas inlet nozzle (not shown). Alternatively, the lower gas inlet 32 can also be designed as an opening in the chamber wall 4 or as a gas inlet field or as a combination of the three variants. In a second side 4*c* of the chamber wall 4, which is opposite to the first side 4*b*, a first gas outlet 34 (in the following lower gas outlet) and a second gas outlet (in the following upper gas outlet) are provided. The upper gas outlet is designed as a gas outlet field 33. The lower gas outlet 34 is designed as an opening in the chamber wall 4, wherein a guiding element or structuring element such as a grid can be inserted into the opening or can precede the opening.

The lower gas inlet 32 and the lower gas outlet 34 are located below the gas inlet field 31 and the gas outlet field 33 respectively, i.e. closer to the working plane 7 and the build area 8 than the gas inlet field 31 and the gas outlet field 33 in a direction perpendicular to the build area 8. The lower gas inlet 32 and the lower gas outlet 34 substantially extend over a first height range of the process chamber 3 from the working plane 7 to a first height $h_1$ of the side 4*b* or 4*c* of the chamber wall 4 above the working plane 7. The gas inlet field 31 and the gas outlet field 33 substantially extend over a second height range of the process chamber 3 between a second height $h_2$, which exceeds the first height $h_1$, and the process chamber height H of the side 4*b* and 4*c* of the chamber wall 4 above the working plane 7. Thus, on the sides 4*b*, 4*c* of the chamber wall 4 an intermediate region 39 is provided between the lower gas inlet 32 and the gas inlet field 31, and between the lower gas outlet 34 and the gas outlet field 33, which intermediate region does not comprise a gas inlet opening or gas outlet opening. The intermediate region 39 substantially extends between the first height $h_1$ and the second height $h_2$.

Preferably, the first height range of the process chamber 3 between the working plane 7 and the first height $h_1$ (i.e. a height extension of the lower gas inlet 32 and gas outlet 34) is smaller than the second height range of process chamber 3 between the second height $h_2$ and the process chamber height H (i.e. a height extension of the gas inlet and gas outlet fields 31, 33). For example, the lower gas inlet 32 and the lower gas outlet 34 can extend over approximately 15% of the process chamber height H, the intermediate region over approximately 15% of the process chamber height H, and the gas inlet field 31 and the gas outlet field 33 over approximately 60% of the process chamber height.

Thus, with respect to the process chamber height, the lower gas inlet 32 and the lower gas outlet 34 are arranged in a region adjacent to the build area 8 and the upper gas inlet, i.e. the gas inlet field 31, and the upper gas outlet, i.e. the gas outlet field 33, are arranged in a region distant from the build area 8.

Figure 3:
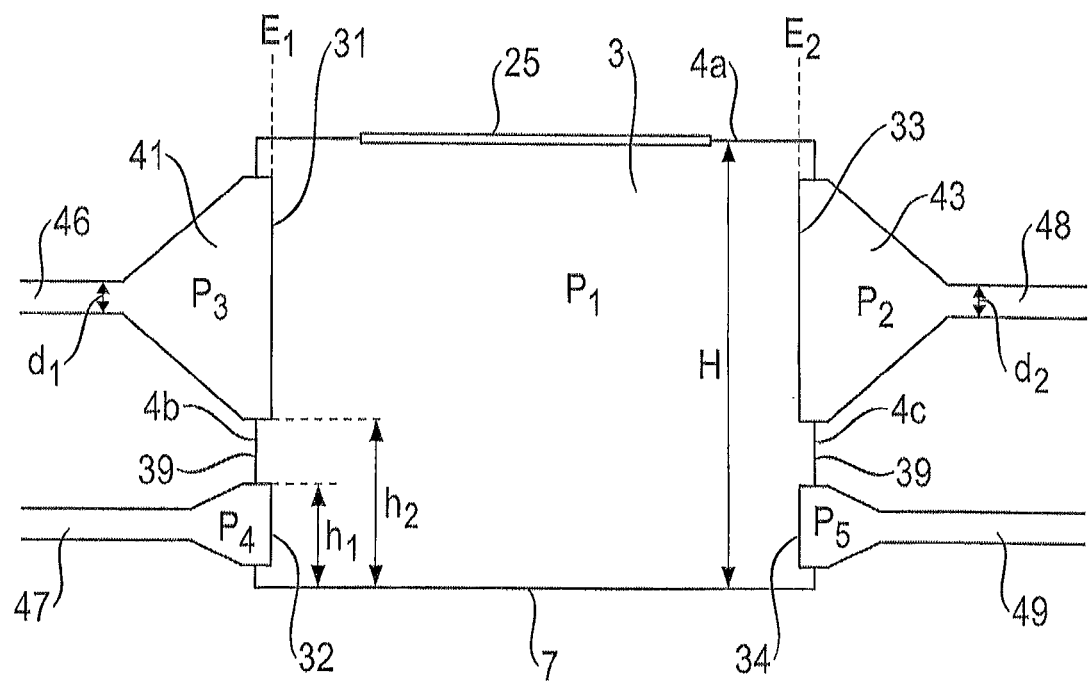
FIG. 3 shows a schematic view in cross-section of a section of a further embodiment of a production device according to the invention.
Figure 6A:
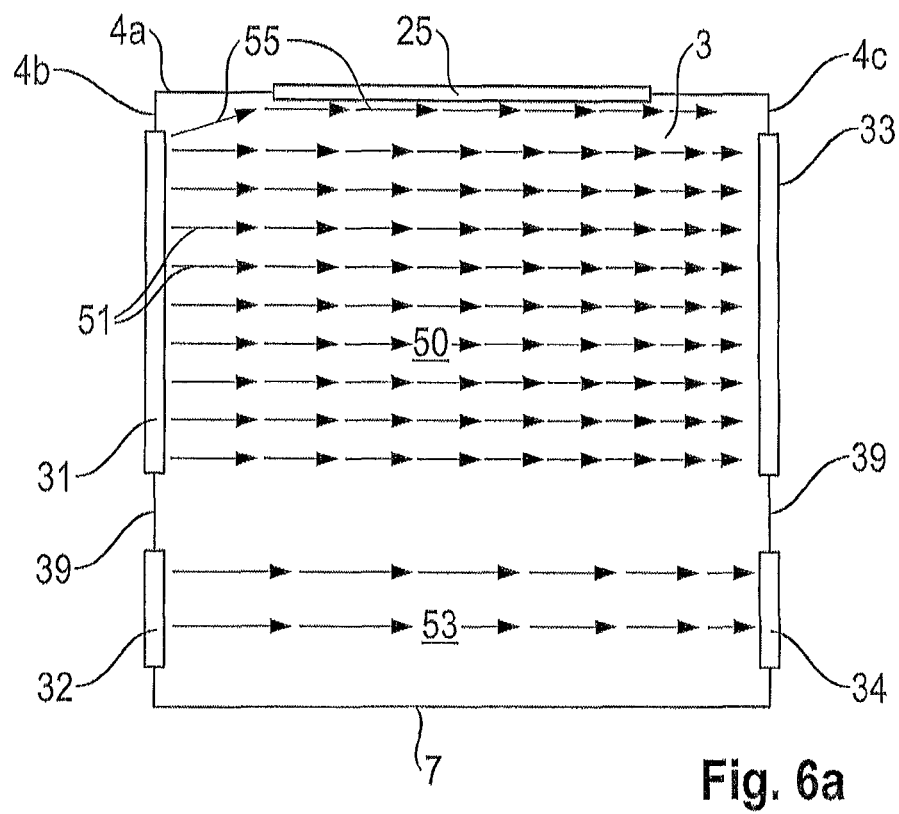
FIGS. 6a and 6b schematically show examples of gas streams generated in the process chamber shown in FIG. 3 during operation of a gas conveying device according to the invention.
Figure 6B:
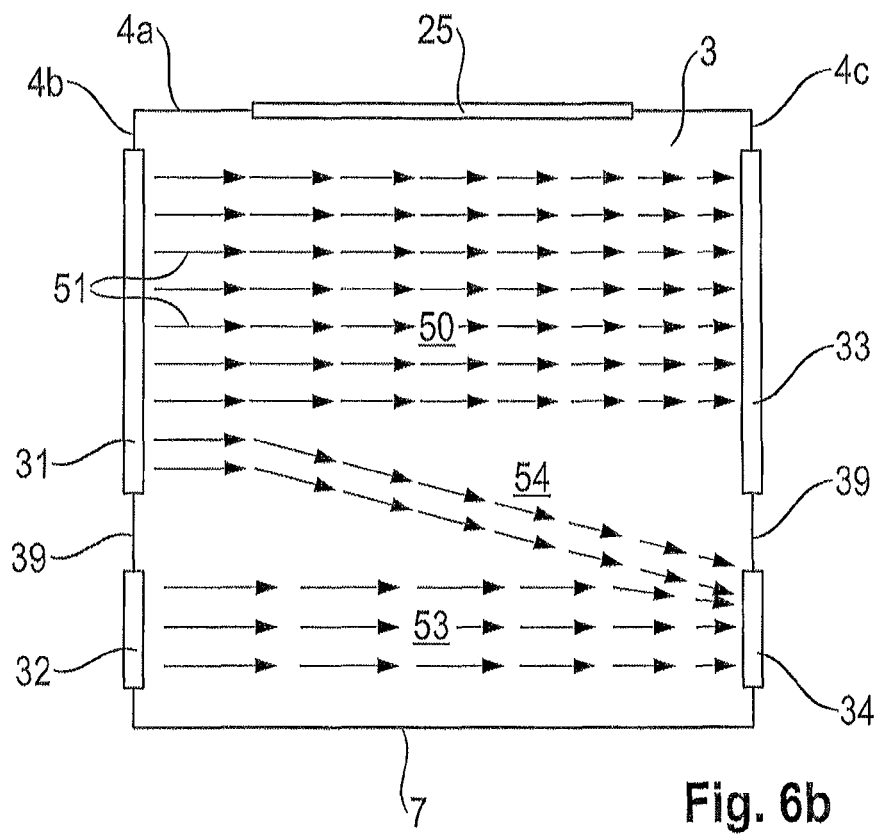

The upper and lower gas inlets and gas outlets are connected to a gas conveying device not shown. They need not be adjacent to the chamber ceiling 4*a* or to the working plane 7, but can also be spaced from the ceiling and the working plane, as shown in FIG. 3 and FIG. 6*a*, 6*b*. Further, they need not be provided in the chamber wall 4, they can, for example, also be offset from the chamber wall 4 and e.g. project into the inside of the process chamber or be set back from the process chamber wall. In the process chamber 3 shown in FIG. 1, the sides 4*b*, 4*c* of the chamber wall 4 extend substantially in a direction perpendicular to the build area 8 so that the gas inlet field 31 and the gas outlet field 33 each lie substantially in a plane that extends perpendicular to the build area 8, i.e. vertically.

The laser sintering device 1 further comprises a storage container 14 for a building material 15 in powder form that can be solidified by electromagnetic radiation, and a recoater 16 that can be moved in a horizontal direction B (also called recoating direction) for applying the building material 15 within the build area 8. Preferably, the recoater 16 extends transversely to its direction of movement over the entire region where material is to be applied. Generally, the recoater 16 thus covers at least one side length or one diameter of the build area 8.

Optionally, a radiant heater not shown in FIG. 1 is arranged in the process chamber 3 or in the process chamber ceiling 4*a*, which radiant heater serves to heat the applied building material 15. For example, an infrared radiator can be provided as a radiant heater.

The laser sintering device 1 further comprises an exposure device 20 as an irradiation device with a laser 21 that generates a laser beam 22 that is deflected by a deflecting device 23 and focused to the working plane 7 by a focusing device 24 via a coupling window 25 that is mounted on the top of the process chamber 3 in the chamber wall 4, i.e. in the ceiling 4*a* of the chamber wall 4. Furthermore, FIG. 1 shows two marginal beams 22' of the laser 21. A marginal beam 22' is an outermost laser beam, i.e. a laser beam located closest to a side 4*b*, 4*c* of the chamber wall 4 that impinges on the building material in the working plane 7 during the production of the object 2. Alternatively, the marginal beam 22' can also be the maximum possible deflected laser beam that can still be focused onto the working plane 7 by means of the imaging optics, in particular by the deflecting device 23, the focusing device 24 and the coupling window 25. FIG. 1 shows a process chamber with one coupling window 25, however, it is also possible to provide several coupling windows in the chamber wall 4 or in the process chamber ceiling 4*a*.

Furthermore, the laser sintering device 1 comprises a control unit 29 by means of which the individual components of the device 1 are controlled in a coordinated manner for implementing the building process. Alternatively, the control unit can also be arranged partly or completely outside the device. The control unit can comprise a CPU, whose operation is controlled by a computer program (software). The computer program can be stored separately from the device on a storage medium from which it can be loaded into the device, in particular into the control unit.

Figure 2:
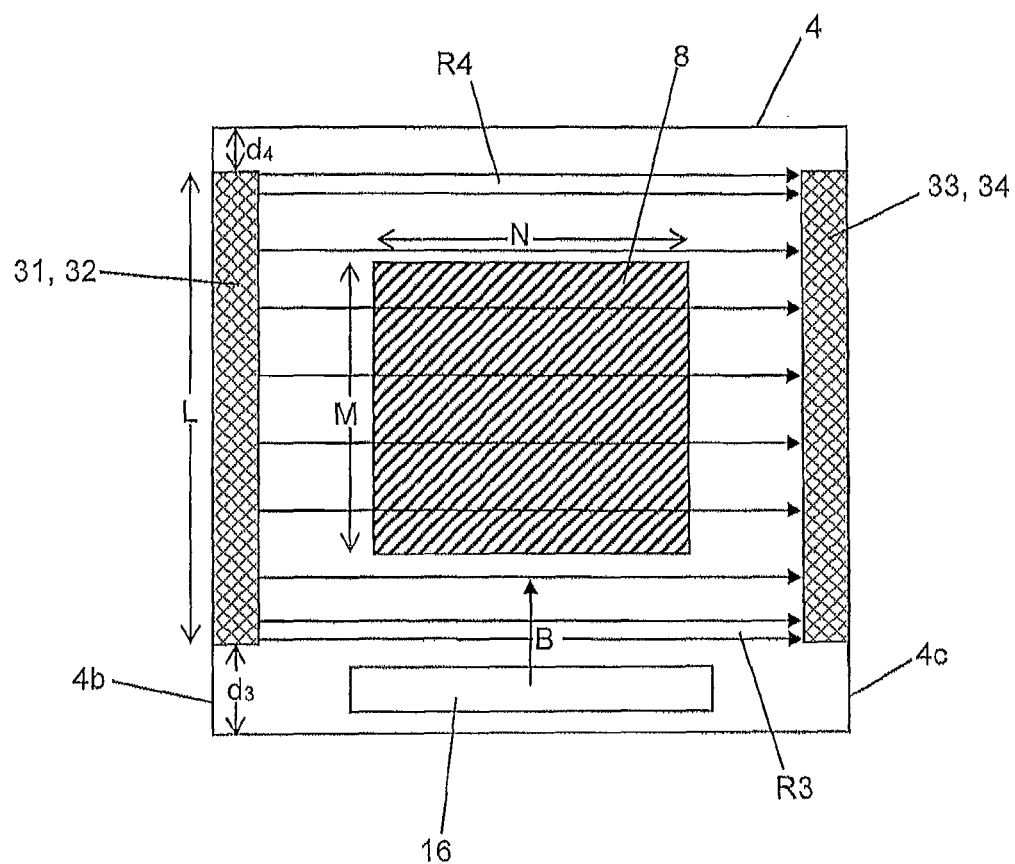
FIG. 2 shows a schematic view in cross-section of a section of a process chamber of the device shown in FIG. 1 in a plan view of the build area.

FIG. 2 schematically shows a top view of the build area 8 that has a length N and a width M. In FIG. 2, the recoater 16 is located in a resting position outside the build area 8, the build area being indicated by oblique lines in FIG. 2, and can be moved in the recoating direction B across the width M of the build area. In contrast to FIG. 1, the recoating direction B does not correspond to an orientation of a shortest connecting line between the lower gas inlet 32 and the lower gas outlet 34 or between the gas inlet field 31 and the gas outlet field 33. In FIG. 2, the recoating direction B is perpendicular to such a connecting line. The intermediate region 39 is not shown in FIG. 2 for reasons of clarity. The gas inlets 31, 32 and gas outlets 33, 34 are indicated by diamonds in FIG. 2.

In the combination of FIG. 2 and FIG. 1, the gas inlet field 31 and the lower gas inlet 32 are arranged along a first side of the build area 8 in the plan view and extend parallel to this side. The gas outlet field 33 and the lower gas outlet 34 are arranged along a second side of the build area 8 opposite to the first side and also extend parallel to this side. Thus, in the plan view, the gas inlet field 31 and the lower gas inlet 32 extend parallel to the gas outlet field 33 and the lower gas outlet 34. They extend substantially along the width M of the build area 8, wherein a length L of the gas inlet field 31, of the lower gas inlet 32, of the gas outlet field 33 and of the lower gas outlet 34 along the width M of the build area 8, i.e. in the horizontal direction (parallel to the working plane 7), exceeds the width M of the build area 8. Contrary to the schematic depiction in FIG. 2, the gas inlet field 31 and the gas outlet field 33 can have differing lengths compared to each other, and the lower gas inlet 32 and the lower gas outlet 34 can have differing lengths compared to each other. Also the gas inlet field 31 and the lower gas inlet 32 as well as the gas outlet field 33 and the lower gas outlet 34 can have differing lengths in comparison to each other.

As shown in FIG. 2, the gas inlet field 31, the lower gas inlet 32, the gas outlet field 33 and the lower gas outlet 34 do not extend over the entire extension of the process chamber 3 along the width M of the build area 8 and thus have a distance $d_3$ or $d_4$ from the process chamber wall 4.

Alternatively to the exemplary embodiment shown in FIG. 2, however, the build area can also deviate from a rectangular shape and can be circular, for example. In this case, for example, the length L can be adapted to a diameter of the circular build area, i.e. can be the same size or larger.

FIG. 3 shows a view of a process chamber 3 in cross-section according to a further embodiment. On the side of the gas inlet field 31 facing away from the process chamber 3, i.e. upstream of the gas inlet field 31, an inlet chamber 41 is provided. On the side of the gas outlet field 33 facing away from the process chamber 3, i.e. downstream of the gas outlet field 33, an outlet chamber 43 is provided. Thus, the inlet chamber 41 and the outlet chamber 43 are at least partially bounded by the gas inlet field 31 and the gas outlet field 33, respectively. The inlet chamber 41 is connected to a gas conveying device not shown via a supply channel 46 that has an average opening cross-sectional area (represented by the average opening diameter $d_1$ in FIG. 3). Similarly, the outlet chamber 43 is connected to the gas conveying device (not shown) via an outlet channel 48 that has an average opening cross-sectional area (represented by the average opening diameter $d_2$ in FIG. 3). The lower gas inlet 32 and the lower gas outlet 34 each are connected to the gas conveying device via channels 47, 49.

The average opening cross-sectional area or the average opening diameter $d_1$ of the supply channel 46 is smaller than a total cross-section of the gas inlet field 31. The average opening cross-sectional area or the average opening diameter $d_2$ of the outlet channel 48 is smaller than a total cross-section of the gas outlet field 33. In order to achieve a widening, preferably a continuous widening, of the opening cross-section from an end of the supply channel 46 and from an end of the outlet channel 48 towards the gas inlet field 31 and the gas outlet field 33, the inlet chamber 41 and the outlet chamber 43 each are funnel-shaped, wherein the small opening area of the respective funnel is connected to the supply channel 46 and the outlet channel 48 and wherein the gas inlet field 31 and the gas outlet field 33 are arranged in the large opening area of the respective funnel.

In the process chamber shown in FIG. 3, the gas inlet field 31 and the gas outlet field 33 are provided within the second height range of the process chamber 3 between the second height $h_2$ and the process chamber height H above the working plane 7 and are provided at a distance from the process chamber ceiling 4a. Likewise, the lower gas inlet 32 and the lower gas outlet 34 are provided within the first height range of the process chamber 3 between the working plane 7 and the first height $h_1$ above the working plane 7 and are provided at a distance from the working plane 7.

In the process chambers shown in FIG. 1 and FIG. 3, the sides 4b, 4c of the chamber wall 4 extend in a direction perpendicular to the working plane 7 so that the gas inlet field 31 is located substantially in a first plane $E_1$ and the gas outlet field 33 is located substantially in a second plane $E_2$, the planes $E_1$, $E_2$ extending perpendicular to the working plane 7. In an alternative embodiment (not shown), the first and second planes $E_1$ and $E_2$ in which the gas inlet field 31 and the gas outlet field 33 are located, respectively, can each be at a respective angle $\alpha_1$ and $\alpha_2$ with the line perpendicular to the working plane 7 and the build area 8. The angle $\alpha_1$ and $\alpha_2$ is e.g. 10° or 20°.

Figures 4A, 4B:
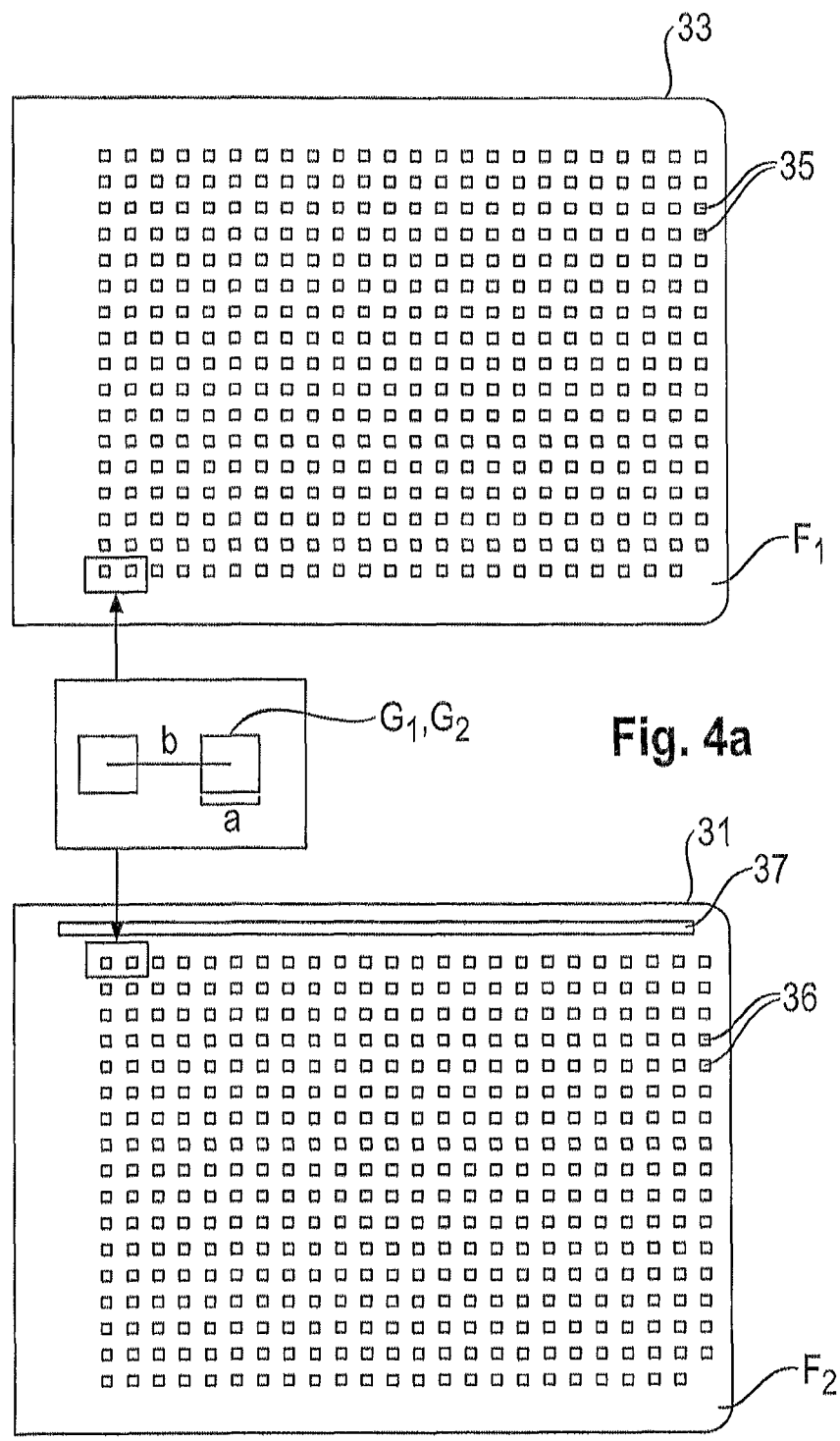
FIG. 4a shows a schematic view of a gas outlet field and FIG. 4b shows a schematic view of a gas inlet field according to a first embodiment of the invention.

FIG. 4a shows the gas outlet field 33 and FIG. 4b shows the gas inlet field 31. The gas outlet field 33 and the gas inlet field 31 have a total surface area $F_1$ and $F_2$, respectively. The gas outlet field 33 is designed as a perforated plate and has a plurality of gas outlet openings 35 (holes) spaced apart from one another for discharging a gas from the process chamber 3. The gas inlet field 31 is also designed as a perforated plate and has a plurality of gas inlet openings 36 (holes) spaced apart from one another for introducing a gas into process chamber 3.

Preferably, the gas inlet field 31 further comprises a slot-shaped gas inlet opening 37 for introducing a gas into the process chamber 3. The slot-shaped gas inlet opening 37 is arranged in the gas inlet field 31 in such a way that it is arranged closer to the process chamber ceiling 4a than the gas inlet openings 36 when the gas inlet field 31 is mounted in the side wall 4b of the process chamber 3. Furthermore, the slot-shaped gas inlet opening 37 is preferably arranged in the gas inlet field 31 such that its longitudinal axis is substantially parallel to a plane in which a surface of the coupling window 25 facing the process chamber 3 is located when the gas inlet field 31 is mounted in the side wall 4b of the process chamber 3.

The gas inlet field 31 and the gas outlet field 33 are designed and/or arranged in the device 1 in such a way that in a projection of the gas inlet field 31 onto the gas outlet field 33 in a direction parallel to the build area 8 the area $F_2$ of the gas inlet field 31 projected onto an area $F_1$ of the gas outlet field 33 has substantially the same surface area as the gas outlet field 33. A tolerable deviation, e.g. due to constructional framework conditions, amounts to 20% in the comparison of the surface area values.

The gas inlet openings 36 and/or gas outlet openings 35 are preferably arranged in a grid pattern in the gas inlet field 31 and the gas outlet field 33, i.e. they are arranged regularly spaced side by side and one below the other in rows and columns. The rows and/or columns can also be offset from each other (not shown in FIG. 4a, b). As shown in FIGS. 4a and 4b, the gas inlet openings 36 and gas outlet openings 35 can be designed, for example, as substantially square holes having a side length a in the gas inlet field 31 or the gas outlet field 33. Neighboring gas inlet openings 36 and/or gas outlet openings 35 within a row and/or a column are spaced at a distance b from one another.

The shape of the gas inlet openings 36 and gas outlet openings 35 is not limited to a square cross-section, but the gas inlet openings 36 and gas outlet openings 35 can have any cross-section, for example they can also be designed as circular or triangular holes. Preferably, the gas inlet openings 36 have substantially the same shape and/or are of the same size and/or have a defined surface area $G_2$. Likewise, the gas outlet openings 35 preferably have substantially the same shape and/or are of the same size and/or have a defined surface area $G_1$. The gas inlet openings 36 and the gas outlet openings 35 can also have the same shape and/or the same surface area and/or be of the same size.

The gas inlet field 31 and the gas outlet field 33 represent a flow resistance for the gas flowing in and out (see below). The flow resistance depends, among other things, on the ratio of the added surface areas $G_2$, $G_1$ of the openings (gas inlet openings 36 or gas outlet openings 35) relative to the total surface area $F_2$ or $F_1$ of the perforated plate (gas inlet field 31 or gas outlet field 33).

Figure 5:
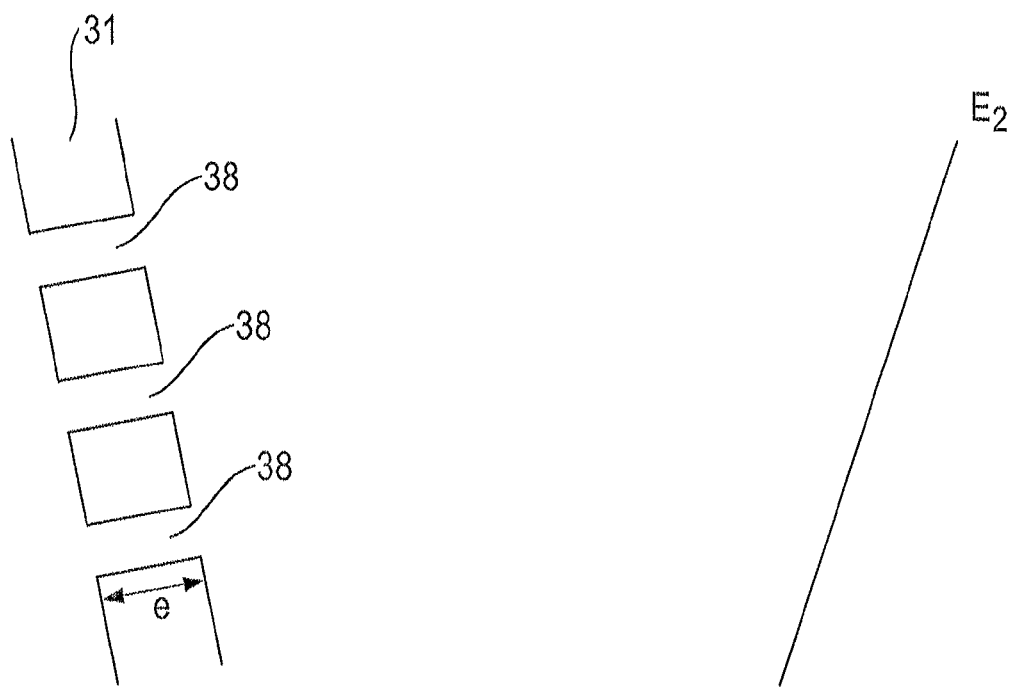
FIG. 5 shows a schematic view of a section of the process chamber shown in FIG. 3 with a gas inlet field according to a second embodiment of the invention.

As an alternative to the gas inlet openings 36 shown in FIG. 4b, the gas inlet field 31 can also include a plurality of gas inlet channels 38 for introducing a gas stream into the process chamber 3, as shown in FIG. 5. Similarly, the gas outlet field 33 can also comprise gas outlet channels (not shown).

The gas inlet channels 38 shown in FIG. 5 extend substantially over a length e in the direction of the gas flowing through them, which can be, for example, the thickness of the side 4b of the chamber wall 4. The orientation of the gas inlet channels 38 is defined by their extension in the direction of the length e, wherein the gas inlet channels 38 extend parallel to each other in their orientation. The gas inlet channels 38 or the orientation of the gas inlet channels 38 determines the average flow direction of the process gas when entering the process chamber 3.

At the lower gas inlet 32, a perforated plate and/or a nozzle element with gas inlet channels (analogous to FIG. 5) can also be provided for introducing the gas into the process chamber 3 (not shown in the figures).

In operation of the laser sintering or laser melting device 1, in order to apply a powder layer, first the support 10 is lowered by a height corresponding to the desired layer thickness. The recoater 16 receives from the supply container 14 an amount of the building material 15 sufficient for the application of a layer and then moves across the build area 8, there applies pulverulent building material 15 to the building base or to a powder layer already present and spreads the building material into a powder layer. Optionally, the building material 15 in powder form is heated to a working temperature by means of a radiant heater (not shown in the figures).

Subsequently, the cross-section of the object 2 to be produced is scanned by the laser beam 22 so that the pulverulent building material 15 is solidified at the locations corresponding to the cross-section of the object 2 to be produced. These steps are repeated until the object 2 is completed and can be removed from the process chamber 3.

In accordance with the invention, during the production of the three-dimensional object 2, yet at least during the selective solidification of the building material layers, a gas (process gas) is supplied to the process chamber 3 by the gas conveying device not shown in order to remove from the process chamber 3 the impurities that are produced, for example, during the selective solidification of metal or metal-based (metal content greater than 50 percent by volume) building material. In this process, a first volumetric portion (first volume flow) of the gas flows through the channel 47 through the lower gas inlet 32 into the process chamber 3. A second volumetric portion (second volume flow) of the gas is introduced through the supply channel 46 into the inlet chamber 41 from where it flows through the gas inlet openings 36 of the gas inlet field 31 of the upper gas inlet into the process chamber 3. Through the gas outlet openings 35 of the gas outlet field 33 of the upper gas outlet and through the lower gas outlet 34, the gas flows also in a defined distribution of volume flows out of the process chamber 3 and through the outlet channel 48 and the channel 49. In this process, the gas flows through the process chamber 3 in an unguided manner, i.e. it is not guided by a device comprising a cavity, such as a pipe or a channel arranged inside the process chamber.

FIGS. 6a and 6b show two examples of gas streams generated in the process chamber 3 during operation of the gas conveying device. To simplify the illustration, the gas streams represented by arrows are only shown in the process chamber itself, no gas streams are shown upstream and downstream of the process chamber. The length of the arrows is to be understood as a measure for a local flow velocity of the gas in the process chamber and the density of the arrows (i.e. a distance to a neighboring arrow) is to be understood as a measure for a local volume flow of the respective gas stream. However, it is explicitly pointed out that a distribution of flow velocities and volume flows is depicted in a strongly schematized and simplified way in FIGS. 6a and 6b. For example, gas movements in the zones of the process chamber 3 that are not filled with arrows are not included in the illustration for reasons of clarity. In addition, the visible arrows can each form an abstraction of local gas movements, e.g. can represent several partial streams with different velocities and directions. As shown in FIG. 6a and FIG. 6b, a lower (first) gas stream 53 is substantially generated in the process chamber 3 by the lower gas inlet 32 and the lower gas outlet 34. The gas inlet field 31 and the gas outlet field 33 substantially generate an upper (second) gas stream 50 in the process chamber 3. Furthermore, the slot-shaped gas inlet opening 37 (not shown in FIG. 6a, b, but in FIG. 4b) of the gas inlet field 31 substantially generates a ceiling gas stream 55 in the process chamber 3, which is shown in FIG. 6a. The ceiling gas stream 55 flows from the slot-shaped gas inlet opening 37 of the gas inlet field 31 towards the process chamber ceiling 4a and directly or at a distance along the process chamber ceiling 4a.

FIG. 6a shows the resulting flow velocities of the gas in the process chamber 3 at a substantially equal ratio of the volume flows introduced through the two gas inlets. The ratio of the volume flows discharged through the two gas outlets is also substantially the same in the example shown in FIG. 6a. In addition to the upper gas stream 50, the lower gas stream 53 and the optional ceiling gas stream 55 shown in FIG. 6a, optionally further a partial stream 54 of the upper gas stream 50 can flow through the process chamber 3, flowing substantially from the gas inlet field 31 to the lower gas outlet 34, as shown in FIG. 6b. The downwardly directed partial stream 54 can occur if a ratio of those process gas volume flows introduced into the process chamber 3 with respect to one another and a ratio of those process gas volume flows discharged from the process chamber 3 with respect to one another is changed in such a way that the volume flow discharged from the process chamber 3 through the lower gas outlet 34 has a higher portion of the total volume flow discharged from the process chamber through the gas outlets 33, 34 than the portion that a volume flow introduced into the process chamber 3 through the lower gas inlet 32 has of the total volume flow introduced into the process chamber through the gas inlets 31, 32. In the case of a closed process gas circuit, there is an additional suctioning effect at the gas outlet 34, which suctioning effect deflects a part of the upper gas stream 50, i.e. the partial stream 54, downwards. The partial stream is thus guided through the partial volume of the process chamber 3 between the height $h_1$ and the height $h_2$ and can, for example, displace or remove impurities, such as smoke, located in this volume. The upper gas stream 50 and the lower gas stream 53 are substantially oriented from the side 4b to the opposite side 4c (shown in FIG. 1) of the process chamber 3 and extend substantially horizontally, i.e. substantially parallel to the build area 8. The lower gas stream 53 has on average a larger flow velocity than the upper gas stream 50 and a volume flow equal to, smaller or larger than the upper gas stream 50. The two gas streams 50, 53 are substantially separated from each other in a spatial manner by a height range of the process chamber 3 that corresponds to the intermediate region 39 (shown in FIG. 1) of the process chamber wall 4. However, an at least partial mixing of the gas streams 50, 53 within the intermediate region 39 in certain operating states is not excluded. Thus, the intermediate region 39 forms a partial volume of the process chamber 3 in which flows are generated in a non-defined manner in certain operating states of the flow device. In addition to the intermediate region 39 shown in FIG. 1, which corresponds to a height range of the process chamber 3, the exemplary embodiment shown in FIG. 2 also includes regions between the process chamber wall 4 of the process chamber 3 and a region where flows are generated in a defined manner between the gas inlets 31, 32 and the gas outlets 33, 34, in which regions no flows are directly generated or generated in a defined manner in any operating state.

The regions have a horizontal extent that forms a distance $d_3$, $d_4$ between the gas inlets 31, 32 or the gas outlets 33, 34 or the marginal partial streams R3, R4 and the process chamber wall 4. Their vertical extension can be identical with the process chamber height H. In order to achieve an even more thorough passing of flows through the process chamber 3 and thus a further improved cleaning effect of the process chamber atmosphere, a number of additional flow devices can be arranged in the process chamber 3, which for example guide or direct gas streams into or through such regions.

Due to the lower gas stream's proximity to the build area 8 and its relatively high flow velocity, the lower gas stream 53 ensures, among other things, an efficient removal of impurities arising in the build area 8 in the course of the laser sintering or laser melting process. In addition, by means of the gas inlet field 31 and the gas outlet field 33, the gas is supplied into and discharged from the process chamber 3 over a large area so that the upper gas stream 50 flows through a large region of the process chamber 3 and thus cleans it.

Impurities of the process chamber atmosphere rising from the build area 8 that are not transported by the lower gas stream 53 or transported away into the lower gas outlet 34 can reach the region of the process chamber 3 above the height $h_1$ or the height $h_2$. These impurities can be dispersed and diluted on their way through the lower gas stream 53 so that their quantity or concentration arriving above the height $h_1$ or the height $h_2$ is reduced. Therefore, a relatively low flow velocity and a preferably continuous activation of the upper gas stream 53 are sufficient for capturing them, transporting them and removing them from the process chamber 3 through the gas outlet field 33.

The gas inlet field 31 and the gas outlet field 33 allow the gas to pass only through the gas inlet openings 36 and the gas outlet openings 35, respectively, and thus form a flow resistance for the gas supplied to the process chamber 3 through the supply channel 46 and the gas discharged from the process chamber through the outlet channel 48. As a result, the gas backs up upstream of the gas inlet field 31 and of the gas outlet field 33, causing an overpressure in the inlet chamber 41 relative to the pressure in the process chamber 3 and an overpressure in the process chamber 3 relative to the pressure in the outlet chamber 43. The flow resistance ensures that any inhomogeneous distribution of pressures and/or flow directions (turbulence) of the incoming gas stream is reduced and preferably substantially eliminated. With reference to the illustration in FIG. 4b, upstream of the gas inlet field 31 (i.e. in the inlet chamber 41) a comparable pressure is established at all gas inlet openings 36. At all gas outlet openings 35 upstream of the gas outlet field 33 (i.e. in the process chamber 3) a comparable pressure is also established, i.e. the pressure distribution in the process chamber 3, the inlet chamber 41 and the outlet chamber 43 is substantially homogeneous with respect to the individual chambers. However, the previously described staggering or cascade of pressure levels is present. As a result, the partial gas inlet streams 51 (shown in FIGS. 6a, 6b) flowing through the gas inlet openings 36 have substantially the same flow velocity and volume flow in comparison to one another. Likewise, the partial gas outlet streams (not shown in the figures) flowing through the gas outlet openings 35 have substantially the same flow velocity and volume flow in comparison to one another.

With reference to the illustration in FIG. 3, a first pressure reference value $p_1$ can be assigned to the process chamber 3, a second pressure reference value $p_2$ can be assigned to the outlet chamber 43 and a third pressure reference value $p_3$ can be assigned to the inlet chamber 41, the third pressure reference value $p_3$ exceeding the first pressure reference value $p_1$ and the first pressure reference value $p_1$ exceeding the second pressure reference value $p_2$. The first pressure reference value $p_1$ is preferably provided by a first average pressure value that represents a pressure in the process chamber 3. Similarly, the second and third pressure reference values $p_2$, $p_3$ are preferably provided by a second and a third average pressure value, respectively, the second average pressure value representing a pressure in the outlet chamber 43 and the third average pressure value representing a pressure in the inlet chamber 41.

Similarly, a fourth pressure reference value $p_4$ is assigned to a region on the side of the lower gas inlet 32 facing away from the side 4b of the process chamber 3 (e.g. in the channel 47) and a fifth pressure reference value $p_5$ is assigned to a region on the side of the lower gas outlet 34 facing away from the side 4c of the process chamber 3 (e.g. in the channel 49). The fourth pressure reference value $p_4$ exceeds the first pressure reference value $p_1$ in the process chamber 3 and the fifth pressure reference value $p_5$ is less than or substantially equal to the first pressure reference value $p_1$. Preferably, the fourth and fifth pressure reference values are provided by a fourth and fifth average pressure value, respectively, the fourth average pressure value representing a pressure in the channel 47 and the fifth average pressure value representing a pressure in the channel 49.

Since the pressures in the various chambers (process chamber, outlet chamber and inlet chamber) can fluctuate, the average pressure values describe a total pressure (overall pressure) averaged in time, wherein the total pressure corresponds to the sum of the static and dynamic pressures of the flow.

For example, a first average pressure value in the process chamber 3 can be approximately 2 kPa (approx. 20 mbar). Then, for example, the second average pressure value can be about 90 Pa less than the first average pressure value, the third average pressure value can be about 50 Pa higher than the first average pressure value, the fourth average pressure value can be about 50 Pa higher than the first average pressure value, and the fifth average pressure value can be substantially the same as the first average pressure value.

The partial stream 54 of the first gas stream 50, also shown in FIG. 6b, substantially flows from the gas inlet field 31 to the lower gas outlet 34, thus its flow direction has a horizontal component (from the side 4b to the side 4c) and a downwardly directed component (towards the working plane 7). The partial stream 54 thus flows through at least a portion of the height range of the process chamber 3 that corresponds to the intermediate region 39 of the process chamber wall 4.

For example, the gas can be supplied into and discharged out of the process chamber 3 in one or more gas circuits by means of the gas conveying device, wherein also in the case of several gas circuits the process chamber 3 forms their common section ("intersection"). A common gas supply or separate gas supplies can be provided for the supply channel 46 and the channel 47 of the lower gas inlet 32. Likewise, a common gas discharge or separate gas discharges can be provided for the outlet channel 48 and the channel 49 of the lower gas outlet 34. Also a separate gas supply can be provided for e.g. the slot-shaped gas inlet opening 37 for generating the ceiling gas stream 55.

With reference to the illustration in FIG. 4b, the slot-shaped gas inlet opening 37 can also be provided separately from the gas inlet field 31 in the side 4b of the chamber wall 4. Furthermore, the slot-shaped gas inlet opening 37 can be closed or not provided so that the gas flows through the process chamber 3 without a ceiling gas stream 55, as shown in FIG. 6b. Furthermore, the other gas streams and partial gas streams can deviate from the gas streams shown in FIG. 6a, 6b and/or the configuration and/or arrangement of the gas inlets and gas outlets can deviate from the embodiments described. Also, both the ceiling gas stream 55 shown in FIG. 6a and the partial stream 54 shown in FIG. 6b can be generated in the process chamber 3, so that they flow through the process chamber 3 at least temporarily simultaneously.

The gas inlet field 31 and/or the gas outlet field 33 and/or a gas inlet field provided at the lower gas inlet 32 can be detachably and/or exchangeably provided at the process chamber wall 4, so that it is possible, for example, to variably adjust the upper gas stream 50, i.e. the partial gas inlet streams 51 and/or the partial gas outlet streams, in particular with respect to their direction and/or flow velocity. A different setting of a local flow direction, flow velocity and/or volume flow distribution can be achieved, for example, by means of a different sum of the surface areas of the opening cross sections, a different distribution and/or orientation of the gas inlet or gas outlet channels, a different number and/or size of the openings and/or a different modification of these criteria in the comparison of the inlets and the outlets to one another. The modified setting can be chosen, for example, between different manufacturing processes or also during an ongoing building process, for which purpose e.g. motor-driven closures of the openings of the gas inlets or gas outlets can be used. Furthermore, the gas streams flowing through the process chamber 3 can be adjusted by controlling the ratio of the volume flows, by which ratio the two gas inlets and/or gas outlets are supplied with gas relative to each other or discharge gas from the process chamber. Also, the upper gas inlet and/or the upper gas outlet can be provided without a gas inlet field or a gas outlet field, respectively.

The process chamber 3 described above is provided with two gas inlets (gas inlet field 31 and lower gas inlet 32) and two gas outlets (gas outlet field 33 and lower gas outlet 34) respectively spaced apart from one another. Alternatively, the process chamber 3 can be provided with only one gas inlet. For example, the process chamber can have only the upper gas inlet designed as a gas inlet field 31 in a previously described exemplary embodiment. In this case, the gas stream flowing in through the gas inlet (or gas inlet field) during operation of the gas conveying device splits into two partial streams in the process chamber, one of which partial streams flows through the process chamber towards the upper gas outlet and one to the lower gas outlet and is discharged through the respective gas outlet. These partial streams can be, for example, the main gas stream 50 and the partial stream 54 (see FIG. 6b), so that a removal of impurities close to the build area is at least partially carried out by the partial stream 54. As a result of the furcation into two partial streams an eventual intermediate region 39 of the process chamber between the upper and the lower gas outlet is also at least partially flowed through. Although providing only a single gas inlet, this embodiment can thus effect removal of impurities from the process chamber to a great extent.

The process chamber 3 and the gas conveying device can also be provided as a flow device for the laser sintering or laser melting device 1, in particular as an equipment or retrofit kit for equipping or retrofitting the device 1.

Although the present invention has been described by reference to a laser sintering or laser melting device it is not limited to laser sintering or laser melting. The invention can be applied to any process for the generative production of a three-dimensional object by applying, layer by layer, and selectively solidifying a building material.

An exposure device as an irradiation device can, for example, comprise one or more gas or solid-state lasers or any other type of laser such as laser diodes, in particular VCSEL (Vertical Cavity Surface Emitting Laser) or VECSEL (Vertical External Cavity Surface Emitting Laser), or a line of these lasers. In general, any device with which energy as a wave or particle radiation can be applied selectively to a layer of the building material can be used as an exposure device. For example, instead of using a laser as an energy beam, another light source, an electron beam, or any other energy or radiation source suited for solidifying the building material can be used. Instead of deflecting a beam, it is also possible to apply exposure with a movable line exposure device. The invention can also be applied to selective mask sintering, in which an extended light source and a mask are used, or to high-speed sintering (HSS), in which a material is selectively applied to the building material, which material increases (absorption sintering) or decreases (inhibition sintering) the radiation absorption at the respective locations, and then a large area of the building material is unselectively irradiated or by a movable line exposure device.

Instead of introducing energy the selective solidification of the applied building material can also be achieved by 3D printing, for example by applying an adhesive. In general, the invention relates to the generative production of an object by applying and selectively solidifying a building material layer by layer, regardless of the way in which the building material is solidified.

Different types of powder can be used as a building material, in particular metal powder, plastic powder, ceramic powder, sand, filled or mixed powder. Instead of a powder, other suitable materials can also be used as a building material.

Preferably, a protective gas is used as a gas, which protective gas does not chemically react with the building material (inert gas), such as nitrogen or argon, depending on the building material used.

The invention claimed is:

1. A flow device for a device for producing a three-dimensional object by a layer-wise selective solidification of a building material at locations corresponding to the cross-section of the object to be produced in the respective layer by irradiation by means of an energetic radiation, comprising:
a gas conveying device for generating a gas stream,
a process chamber with a build area for building the object,
wherein the process chamber at least comprises a first gas inlet for introducing a gas stream into the process chamber and a first gas outlet and a second gas outlet for discharging a gas stream from the process chamber, wherein the second gas outlet is spaced from the first gas outlet,
wherein the first gas outlet is arranged closer to the build area than the second gas outlet in a direction perpendicular to the build area, and
wherein the first gas outlet is provided substantially within a first height range of the process chamber with respect to its extension in a direction perpendicular to the build area and the second gas outlet is provided substantially within a second height range of the process chamber with respect to its extension in a direction perpendicular to the build area, wherein the first height range of the process chamber corresponds to a lower third of a distance of the build area from a process chamber ceiling and the second height range of the process chamber corresponds to the upper four fifths of the distance of the build area from the process chamber ceiling.

2. The flow device of claim 1, wherein the first gas outlet and/or the second gas outlet is/are configured to and/or arranged on the process chamber and/or wherein the gas conveying device is controlled so that a first pressure reference value that is assigned to a region on a side of the first and second gas outlets facing the process chamber exceeds a second pressure reference value that is assigned to a region on a side of the second gas outlet facing away from the process chamber and/or wherein the first pressure reference value exceeds or is substantially equal to a fifth pressure reference value that is assigned to a region on a side of the first gas outlet facing away from the process chamber and/or
wherein the first gas inlet is configured to and/or arranged on the process chamber and/or wherein the gas conveying device is controlled so that a first pressure reference value that is assigned to a region on a side of the first gas inlet facing the process chamber is smaller than a fourth pressure reference value that is assigned to a region on a side of the first gas inlet facing away from the process chamber.

3. The flow device of claim 1, wherein an intermediate region of the process chamber is provided between the first gas outlet and the second gas outlet, wherein the intermediate region does not have a gas outlet opening and extends at least in a vertical spatial direction.

4. The flow device of claim 1, wherein the second gas outlet comprises at least one gas outlet field having a plurality of gas outlet openings spaced apart from one another for discharging a gas stream from the process chamber.

5. The flow device of claim 4, comprising at least one outlet chamber downstream of the gas outlet field, the outlet chamber being at least partially bounded by the at least one gas outlet field.

6. The flow device of claim 4, wherein a maximum horizontal extension of the gas outlet field comprises at least 60% of a side length or a diameter of the build area.

7. The flow device of claim 1, wherein the process chamber comprises a second gas inlet spaced from the first gas inlet, wherein the first gas inlet is arranged closer to the build area than the second gas inlet in a direction perpendicular to the build area and
wherein the first gas inlet is provided substantially within the first height range of the process chamber and the second gas inlet is provided substantially within the second height range of the process chamber.

8. The flow device of claim 7, wherein the second gas inlet is configured to and/or arranged on the process chamber and/or wherein the gas conveying device is controlled so that a first pressure reference value that is assigned to a region on a side of the second gas inlet facing the process chamber is smaller than a third pressure reference value that is assigned to a region on a side of the second gas inlet facing away from the process chamber.

9. The flow device of claim 7, wherein the first gas inlet and/or the second gas inlet is/are provided on a first side of the process chamber and the first gas outlet and/or the second gas outlet is/are provided on a second side of the process chamber opposite the first side.

10. The flow device of claim 7, the flow device being configured and/or controlled so that at least a first gas stream is generated in the process chamber, the first gas stream being oriented from the first gas inlet to the first gas outlet, and a second gas stream, the second gas stream being oriented from the second gas inlet to the second gas outlet,
wherein the first gas stream has on average a different flow velocity than the second gas stream and/or
wherein a ratio of an average flow velocity of the first gas stream and an average flow velocity of the second gas stream is at least 1.5:1.

11. The flow device of claim 7, wherein the second gas inlet comprises at least one gas inlet field having a plurality of gas inlet openings spaced apart from one another for introducing a gas stream into the process chamber.

12. The flow device of claim 11 comprising at least one inlet chamber upstream of the gas inlet field, the inlet chamber being at least partially bounded by the at least one gas inlet field.

13. The flow device of claim 11, wherein a maximum horizontal extension of the gas inlet field comprises at least 60% of a side length of a rectangular build area or of a diameter of a circular build area.

14. The flow device of claim 1,
wherein the process chamber comprises a second gas inlet spaced from the first gas inlet,
wherein the first gas inlet is arranged closer to the build area than the second gas inlet in a direction perpendicular to the build area,
wherein the second gas inlet comprises at least one gas inlet field having a plurality of gas inlet openings spaced apart from one another for introducing a gas stream into the process chamber,
wherein the second gas outlet comprises at least one gas outlet field having a plurality of gas outlet openings spaced apart from one another for discharging a gas stream from the process chamber,
wherein the gas outlet field of the second gas outlet is located substantially in a plane whose orientation satisfies at least one of the following conditions:
  the plane extends substantially perpendicular to the build area;
  the plane extends substantially perpendicularly to an average direction of a number of partial gas inlet streams of the gas stream, which partial gas inlet streams flow through the gas inlet field of the second gas inlet when the gas stream enters the process chamber in operation;
  the orientation of the plane is adapted to an orientation of a number of gas inlet channels of the gas inlet field of the second gas inlet, wherein a deviation of the orientation of all gas inlet channels of the gas inlet field of the second gas inlet from the orientation of the plane of the gas outlet field is at least 30°.

15. The flow device of claim 2,
wherein the second gas outlet comprises at least one gas outlet field having a plurality of gas outlet openings spaced apart from one another for discharging a gas stream from the process chamber,
wherein the flow device comprises at least one outlet chamber downstream of the gas outlet field, the outlet chamber being at least partially bounded by the at least one gas outlet field,
wherein the first pressure reference value comprises a first average pressure value representing a pressure in the process chamber and wherein the second pressure reference value comprises a second average pressure value representing a pressure in the outlet chamber,
wherein during operation the first average pressure value is greater than the second average pressure value and/or greater by 120 Pa at most, and/or
wherein the first gas inlet comprises at least one gas inlet field having a plurality of gas inlet openings spaced apart from one another for introducing a gas stream into the process chamber,
wherein the first pressure reference value comprises a first average pressure value representing a pressure in the process chamber and wherein the fourth pressure reference value comprises a fourth average pressure value,
wherein during operation the fourth average pressure value is greater than the first average pressure value and/or
wherein the fifth pressure reference value comprises a fifth average pressure value and the first pressure reference value comprises a first average pressure value.

16. The flow device of claim 2, wherein the second gas inlet comprises at least one gas inlet field having a plurality of gas inlet openings spaced apart from one another for introducing a gas stream into the process chamber,
wherein the flow device comprises at least one inlet chamber upstream of the gas inlet field, the inlet chamber being at least partially bounded by the at least one gas inlet field,
wherein the first pressure reference value comprises a first average pressure value representing a pressure in the process chamber and the third pressure reference value comprises a third average pressure value representing a pressure in the inlet chamber,
wherein during operation the third average pressure value is greater than the first average pressure value.

\* \* \* \* \*